(12) United States Patent
Clayton et al.

(10) Patent No.: US 10,266,221 B2
(45) Date of Patent: Apr. 23, 2019

(54) VEHICLE FUEL ECONOMY BY OPTIMIZING EFFECTIVE TIRE ROLLING RESISTANCE

(71) Applicants:Compagnie Generale des Etablissements Michelin, Clermont-Ferrand (FR); Michelin Recherche et Technique S.A., Granges-Paccot (CH)

(72) Inventors: William Bennett Clayton, Simpsonville, SC (US); Calvin Rhett Bradley, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 36 days.

(21) Appl. No.: 15/278,570

(22) Filed: Sep. 28, 2016

(65) Prior Publication Data

US 2017/0029050 A1 Feb. 2, 2017

Related U.S. Application Data

(63) Continuation of application No. 14/377,067, filed as application No. PCT/US2012/024690 on Feb. 10, 2012, now Pat. No. 9,481,415.

(51) Int. Cl.
*B62D 61/00* (2006.01)
*B62D 61/12* (2006.01)
(Continued)

(52) U.S. Cl.
CPC ......... *B62D 61/125* (2013.01); *B60G 17/015* (2013.01); *B60G 17/017* (2013.01); *B62D 61/12* (2013.01); *B60G 2204/47* (2013.01); *B60G 2400/60* (2013.01); *B60G 2400/61* (2013.01); *B60G 2800/214* (2013.01)

(58) Field of Classification Search
None
See application file for complete search history.

(56) References Cited

U.S. PATENT DOCUMENTS

| 5,193,063 A | 3/1993 | Assh |
| 5,549,322 A * | 8/1996 | Hauri ................... B60G 11/27 180/209 |

(Continued)

FOREIGN PATENT DOCUMENTS

WO 9407737 A1 4/1994

OTHER PUBLICATIONS

International Search Report and Written Opinion dated May 29, 2014.

*Primary Examiner* — Truc M Do
(74) *Attorney, Agent, or Firm* — John Steckler Schwab

(57) ABSTRACT

The subject matter of the present invention relates generally to a vehicle that has axles with tires mounted thereon with at least one axle that is a lift axle, and more specifically, to a method that optimizes the effective tire rolling resistance by adjusting the load on the tires, resulting in an improvement in the fuel economy of the vehicle. According to one embodiment, the method takes into consideration the rolling resistance characteristics of the tires placed onto the axles of the vehicle and provides an algorithm for optimizing their rolling resistance by raising or lowering the lift axle.

21 Claims, 16 Drawing Sheets

(51) Int. Cl.
*B60G 17/017* (2006.01)
*B60G 17/015* (2006.01)

(56) References Cited

U.S. PATENT DOCUMENTS

| | | | | |
|---|---|---|---|---|
| 6,619,639 | B1* | 9/2003 | Shelley | B60G 7/008 |
| | | | | 267/292 |
| 6,810,982 | B2* | 11/2004 | Kuhn | B62D 61/125 |
| | | | | 180/209 |
| 6,997,464 | B2* | 2/2006 | Yakimishyn | B60G 5/00 |
| | | | | 280/6.159 |
| 7,152,866 | B2* | 12/2006 | Chalin | B60G 3/20 |
| | | | | 280/86.5 |
| 7,665,745 | B2* | 2/2010 | Bjorkgard | B60G 11/64 |
| | | | | 180/209 |
| 7,748,724 | B2* | 7/2010 | Gottschalk | B60G 9/003 |
| | | | | 280/86.5 |
| 7,878,516 | B2* | 2/2011 | Gottschalk | B60B 35/08 |
| | | | | 280/124.11 |
| 8,177,243 | B2* | 5/2012 | Boisture | B62D 61/12 |
| | | | | 280/81.6 |
| 9,776,677 | B2* | 10/2017 | Yakimishyn | B62D 61/125 |
| 2001/0042728 | A1* | 11/2001 | Miyazawa | B60P 3/28 |
| | | | | 212/195 |
| 2002/0117823 | A1* | 8/2002 | Mlsna | B60G 17/0523 |
| | | | | 280/86.5 |
| 2004/0178594 | A1* | 9/2004 | Keeler | B62D 61/12 |
| | | | | 280/86.5 |
| 2006/0170168 | A1* | 8/2006 | Rotz | B60G 17/0155 |
| | | | | 280/5.501 |
| 2007/0069877 | A1 | 3/2007 | Fogelstrom | |
| 2011/0101257 | A1 | 5/2011 | Morris et al. | |
| 2015/0329099 | A1* | 11/2015 | Zawacki | B60G 17/052 |
| | | | | 701/37 |

* cited by examiner

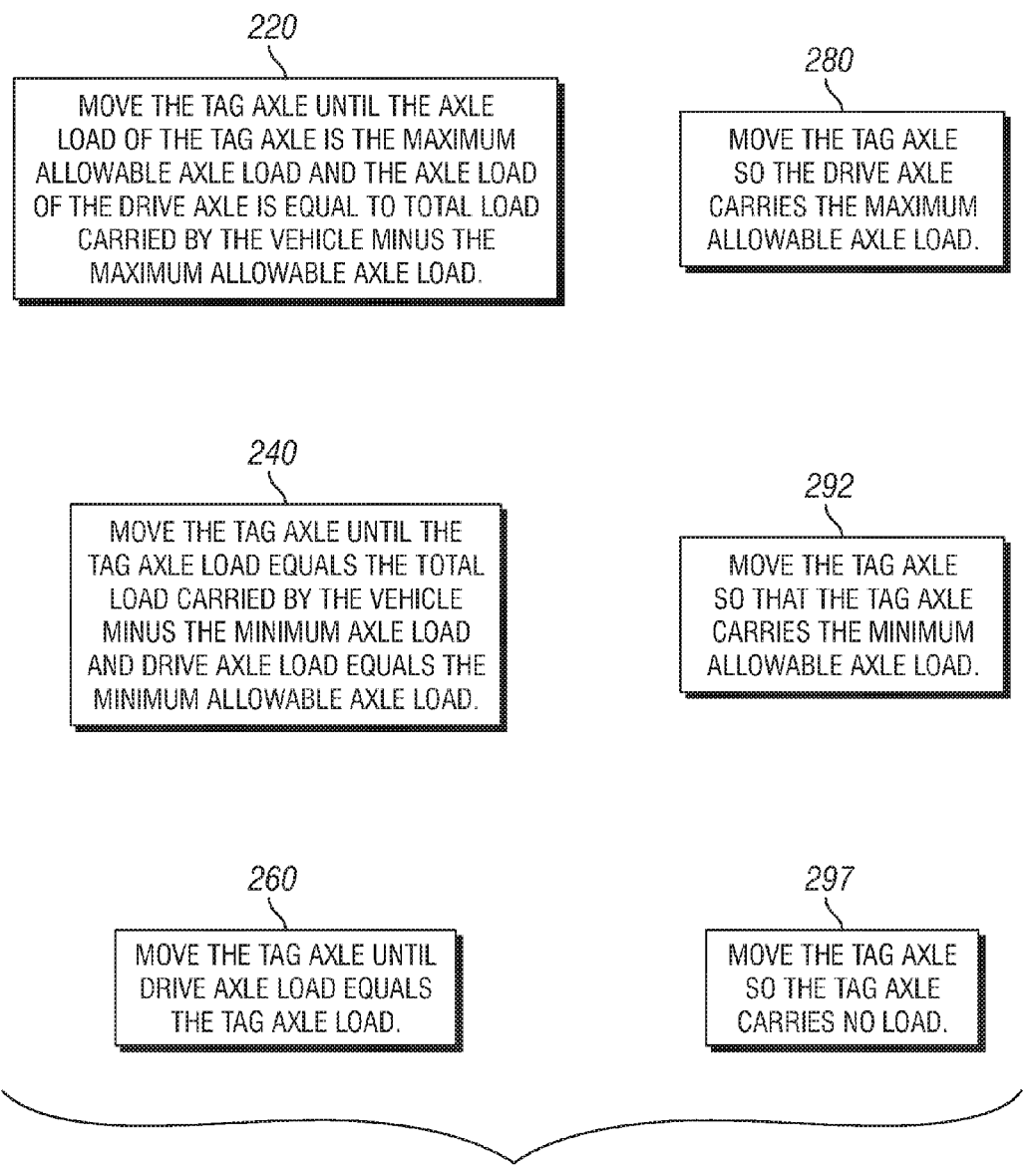

| LMAX | 17000 | | | | | | | | |
|---|---|---|---|---|---|---|---|---|---|
| LMIN | 3500 | | | CALCULATIONS WITH LOAD TRANSFER | | | CALCULATIONS NO LOAD TRANSFER | | | |
| LTOTAL (LBS) | LDRIVE (LBS) | LTAG (LBS) | CRR DRIVE (KG/TON) | CRR TAG (KG/TON) | CRR EFFECTIVE (KG/TON) | CRR DRIVE (KG/TON) | CRR TAG (KG/TON) | CRR EFFECTIVE (KG/TON) | CRR DIFFERENCE (KG/TON) | CRR DIFFERENCE (%) |
| 34000 | 17000 | 17000 | 8.20 | 6.00 | 7.10 | 8.20 | 6.00 | 7.10 | 0.00 | 0% |
| 33000 | 16000 | 17000 | 8.25 | 6.00 | 7.09 | 8.22 | 6.02 | 7.12 | -0.03 | 0% |
| 32000 | 15000 | 17000 | 8.30 | 6.00 | 7.08 | 8.25 | 6.04 | 7.14 | -0.06 | -1% |
| 31000 | 14000 | 17000 | 8.36 | 6.00 | 7.07 | 8.28 | 6.06 | 7.17 | -0.10 | -1% |
| 30000 | 13000 | 17000 | 8.42 | 6.00 | 7.05 | 8.30 | 6.08 | 7.19 | -0.14 | -2% |
| 29000 | 12000 | 17000 | 8.49 | 6.00 | 7.03 | 8.33 | 6.10 | 7.21 | -0.18 | -3% |
| 28000 | 11000 | 17000 | 8.56 | 6.00 | 7.01 | 8.36 | 6.12 | 7.24 | -0.23 | -3% |
| 27000 | 10000 | 17000 | 8.65 | 6.00 | 6.98 | 8.39 | 6.14 | 7.27 | -0.29 | -4% |
| 26000 | 9000 | 17000 | 8.74 | 6.00 | 6.95 | 8.42 | 6.16 | 7.29 | -0.35 | -5% |
| 25000 | 8000 | 17000 | 8.84 | 6.00 | 6.91 | 8.46 | 6.19 | 7.32 | -0.41 | -6% |
| 24000 | 7000 | 17000 | 8.96 | 6.00 | 6.86 | 8.49 | 6.21 | 7.35 | -0.49 | -7% |
| 23000 | 6000 | 17000 | 9.10 | 6.00 | 6.81 | 8.53 | 6.24 | 7.38 | -0.57 | -8% |
| 22000 | 5000 | 17000 | 9.27 | 6.00 | 6.74 | 8.56 | 6.27 | 7.42 | -0.67 | -9% |
| 21000 | 4000 | 17000 | 9.48 | 6.00 | 6.66 | 8.60 | 6.30 | 7.45 | -0.79 | -11% |
| 20000 | 3500 | 16500 | 9.60 | 6.02 | 6.65 | 8.65 | 6.33 | 7.49 | -0.84 | -11% |
| 19000 | 3500 | 15500 | 9.60 | 6.06 | 6.71 | 8.69 | 6.36 | 7.53 | -0.82 | -11% |
| 18000 | 3500 | 14500 | 9.60 | 6.10 | 6.78 | 8.74 | 6.39 | 7.57 | -0.79 | -10% |
| 17000 | 3500 | 13500 | 9.60 | 6.14 | 6.85 | 8.79 | 6.43 | 7.61 | -0.76 | -10% |
| 16000 | 3500 | 12500 | 9.60 | 6.19 | 6.93 | 8.84 | 6.47 | 7.66 | -0.72 | -9% |
| 15000 | 3500 | 11500 | 9.60 | 6.24 | 7.02 | 8.90 | 6.51 | 7.71 | -0.68 | -9% |
| 14000 | 3500 | 10500 | 9.60 | 6.30 | 7.12 | 8.96 | 6.56 | 7.76 | -0.64 | -8% |
| 13000 | 3500 | 9500 | 9.60 | 6.36 | 7.23 | 9.03 | 6.61 | 7.82 | -0.58 | -7% |
| 12000 | 3500 | 8500 | 9.60 | 6.43 | 7.36 | 9.10 | 6.66 | 7.88 | -0.52 | -7% |
| 11000 | 3500 | 7500 | 9.60 | 6.51 | 7.50 | 9.18 | 6.72 | 7.95 | -0.45 | -6% |
| 10000 | 3500 | 6500 | 9.60 | 6.61 | 7.65 | 9.27 | 6.78 | 8.02 | -0.37 | -5% |
| 9000 | 3500 | 5500 | 9.60 | 6.72 | 7.84 | 9.37 | 6.85 | 8.11 | -0.27 | -3% |
| 8000 | 3500 | 4500 | 9.60 | 6.85 | 8.06 | 9.48 | 6.93 | 8.21 | -0.15 | -2% |
| 7000 | 3500 | 3500 | 9.60 | 7.03 | 8.32 | 9.60 | 7.03 | 8.32 | 0.00 | 0% |

FIG. 6

| LTOTAL (LBS) | LSTEER (LBS) | STEER AXLE CRR STEER (KG/TON) | DRIVE AXLE CASE 1 CRR EFFECTIVE (KG/TON) | DRIVE AXLE NO LOAD TRANSFER CRR EFFECTIVE (KG/TON) | TRAILER AXLE CRR TRAILER (KG/TON) | CASE 1 VEHICLE CRR EFFECTIVE (KG/TON) | NO LOAD TRANSFER VEHICLE CRR EFFECTIVE | VEHICLE CRR EFFECTIVE DIFFERENCE (KG/TON) | VEHICLE CRR EFFECTIVE DIFFERENCE (%) | ESTIMATED FUEL SAVINGS (%) |
|---|---|---|---|---|---|---|---|---|---|---|
| 34000 | 12000 | 7.8 | 7.1 | 7.1 | 6.0 | 6.7 | 6.7 | 0.0 | 0.0% | 0.0% |
| 33000 | 12000 | 7.8 | 7.1 | 7.1 | 6.0 | 6.7 | 6.7 | 0.0 | -0.2% | 0.1% |
| 32000 | 12000 | 7.8 | 7.1 | 7.1 | 6.0 | 6.8 | 6.8 | 0.0 | -0.4% | 0.1% |
| 31000 | 12000 | 7.8 | 7.1 | 7.2 | 6.1 | 6.8 | 6.8 | 0.0 | -0.6% | 0.2% |
| 30000 | 12000 | 7.8 | 7.0 | 7.2 | 6.1 | 6.8 | 6.8 | -0.1 | -0.9% | 0.3% |
| 29000 | 12000 | 7.8 | 7.0 | 7.2 | 6.1 | 6.8 | 6.9 | -0.1 | -1.1% | 0.3% |
| 28000 | 12000 | 7.8 | 7.0 | 7.3 | 6.1 | 6.8 | 6.9 | -0.1 | -1.4% | 0.4% |
| 27000 | 12000 | 7.8 | 6.9 | 7.3 | 6.2 | 6.8 | 6.9 | -0.1 | -1.7% | 0.5% |
| 26000 | 12000 | 7.8 | 6.9 | 7.3 | 6.2 | 6.8 | 6.9 | -0.1 | -2.0% | 0.6% |
| 25000 | 12000 | 7.8 | 6.9 | 7.4 | 6.2 | 6.8 | 7.0 | -0.2 | -2.4% | 0.7% |
| 24000 | 12000 | 7.8 | 6.8 | 7.4 | 6.2 | 6.8 | 7.0 | -0.2 | -2.8% | 0.8% |
| 23000 | 12000 | 7.8 | 6.7 | 7.4 | 6.3 | 6.8 | 7.0 | -0.2 | -3.2% | 1.0% |
| 22000 | 12000 | 7.8 | 6.7 | 7.5 | 6.3 | 6.8 | 7.1 | -0.3 | -3.8% | 1.1% |
| 21000 | 12000 | 7.8 | 6.6 | 7.5 | 6.3 | 6.8 | 7.1 | -0.3 | -4.3% | 1.3% |
| 20000 | 12000 | 7.8 | 6.7 | 7.6 | 6.4 | 6.8 | 7.1 | -0.3 | -4.5% | 1.4% |
| 19000 | 12000 | 7.8 | 6.8 | 7.6 | 6.4 | 6.9 | 7.2 | -0.3 | -4.3% | 1.3% |
| 18000 | 12000 | 7.8 | 6.9 | 7.7 | 6.4 | 6.9 | 7.2 | -0.3 | -4.1% | 1.2% |
| 17000 | 12000 | 7.8 | 6.9 | 7.7 | 6.5 | 7.0 | 7.3 | -0.3 | -3.9% | 1.2% |
| 16000 | 12000 | 7.8 | 7.0 | 7.8 | 6.5 | 7.1 | 7.3 | -0.3 | -3.6% | 1.1% |
| 15000 | 12000 | 7.8 | 7.1 | 7.8 | 6.6 | 7.1 | 7.4 | -0.2 | -3.3% | 1.0% |
| 14000 | 12000 | 7.8 | 7.2 | 7.9 | 6.6 | 7.2 | 7.4 | -0.2 | -3.0% | 0.9% |
| 13000 | 12000 | 7.8 | 7.4 | 7.9 | 6.7 | 7.3 | 7.4 | -0.2 | -2.7% | 0.8% |
| 12000 | 12000 | 7.8 | 7.5 | 8.0 | 6.7 | 7.4 | 7.5 | -0.2 | -2.3% | 0.7% |
| 11000 | 12000 | 7.8 | 7.7 | 8.1 | 6.8 | 7.4 | 7.6 | -0.1 | -2.0% | 0.6% |
| 10000 | 12000 | 7.8 | 7.8 | 8.1 | 6.9 | 7.5 | 7.6 | -0.1 | -1.5% | 0.5% |
| 9000 | 12000 | 7.8 | 8.1 | 8.2 | 6.9 | 7.6 | 7.6 | -0.1 | -1.1% | 0.3% |
| 8000 | 12000 | 7.8 | 8.1 | 8.2 | 6.9 | 7.6 | 7.7 | 0.0 | -0.6% | 0.2% |
| 7000 | 12000 | 7.8 | 8.3 | 8.3 | 7.0 | 7.7 | 7.7 | 0.0 | 0.0% | 0.0% |

FIG. 7

| LMAX | 17000 | | | | | | | | |
|---|---|---|---|---|---|---|---|---|---|
| LMIN | 3500 | | | | | | | | |
| | | | CALCULATIONS WITH LOAD TRANSFER | | | CALCULATIONS NO LOAD TRANSFER | | | |
| LTOTAL (LBS) | LDRIVE (LBS) | LTAG (LBS) | CRR DRIVE (KG/TON) | CRR TAG (KG/TON) | CRR EFFECTIVE (KG/TON) | CRR DRIVE (KG/TON) | CRR TAG (KG/TON) | CRR EFFECTIVE (KG/TON) | CRR DIFFERENCE (KG/TON) | CRR DIFFERENCE (%) |
| 34000 | 17000 | 17000 | 8.20 | 8.20 | 8.20 | 8.20 | 8.20 | 8.20 | 0.00 | 0.0% |
| 33000 | 17000 | 16000 | 8.20 | 8.25 | 8.22 | 8.22 | 8.22 | 8.22 | 0.00 | 0.0% |
| 32000 | 17000 | 15000 | 8.20 | 8.30 | 8.25 | 8.25 | 8.25 | 8.25 | 0.00 | 0.0% |
| 31000 | 17000 | 14000 | 8.20 | 8.36 | 8.27 | 8.28 | 8.28 | 8.28 | 0.00 | 0.0% |
| 30000 | 17000 | 13000 | 8.20 | 8.42 | 8.30 | 8.30 | 8.30 | 8.30 | -0.01 | -0.1% |
| 29000 | 17000 | 12000 | 8.20 | 8.49 | 8.32 | 8.33 | 8.33 | 8.33 | -0.01 | -0.1% |
| 28000 | 17000 | 11000 | 8.20 | 8.56 | 8.34 | 8.36 | 8.36 | 8.36 | -0.02 | -0.2% |
| 27000 | 17000 | 10000 | 8.20 | 8.65 | 8.37 | 8.39 | 8.39 | 8.39 | -0.03 | -0.3% |
| 26000 | 17000 | 9000 | 8.20 | 8.74 | 8.39 | 8.42 | 8.42 | 8.42 | -0.04 | -0.4% |
| 25000 | 17000 | 8000 | 8.20 | 8.84 | 8.41 | 8.46 | 8.46 | 8.46 | -0.05 | -0.6% |
| 24000 | 17000 | 7000 | 8.20 | 8.96 | 8.42 | 8.49 | 8.49 | 8.49 | -0.07 | -0.8% |
| 23000 | 17000 | 6000 | 8.20 | 9.10 | 8.43 | 8.53 | 8.53 | 8.53 | -0.09 | -1.1% |
| 22000 | 17000 | 5000 | 8.20 | 9.27 | 8.44 | 8.56 | 8.56 | 8.56 | -0.12 | -1.4% |
| 21000 | 17000 | 4000 | 8.20 | 9.48 | 8.44 | 8.60 | 8.60 | 8.60 | -0.16 | -1.9% |
| 20000 | 16500 | 3500 | 8.22 | 9.60 | 8.47 | 8.65 | 8.65 | 8.65 | -0.18 | -2.1% |
| 19000 | 15500 | 3500 | 8.28 | 9.60 | 8.52 | 8.69 | 8.69 | 8.69 | -0.17 | -2.0% |
| 18000 | 14500 | 3500 | 8.33 | 9.60 | 8.58 | 8.74 | 8.74 | 8.74 | -0.16 | -1.8% |
| 17000 | 17000 | 0 | 8.20 | 8.20 | 8.20 | 8.79 | 8.79 | 8.79 | -0.59 | -6.7% |
| 16000 | 16000 | 0 | 8.25 | 8.20 | 8.25 | 8.84 | 8.84 | 8.84 | -0.59 | -6.7% |
| 15000 | 15000 | 0 | 8.30 | 8.20 | 8.30 | 8.90 | 8.90 | 8.90 | -0.60 | -6.7% |
| 14000 | 14000 | 0 | 8.36 | 8.20 | 8.36 | 8.96 | 8.96 | 8.96 | -0.60 | -6.7% |
| 13000 | 13000 | 0 | 8.42 | 8.20 | 8.42 | 9.03 | 9.03 | 9.03 | -0.61 | -6.7% |
| 12000 | 12000 | 0 | 8.49 | 8.20 | 8.49 | 9.10 | 9.10 | 9.10 | -0.61 | -6.7% |
| 11000 | 11000 | 0 | 8.56 | 8.20 | 8.56 | 9.18 | 9.18 | 9.18 | -0.61 | -6.7% |
| 10000 | 10000 | 0 | 8.65 | 8.20 | 8.65 | 9.27 | 9.27 | 9.27 | -0.62 | -6.7% |
| 9000 | 9000 | 0 | 8.74 | 8.20 | 8.74 | 9.37 | 9.37 | 9.37 | -0.63 | -6.7% |
| 8000 | 8000 | 0 | 8.84 | 8.20 | 8.84 | 9.48 | 9.48 | 9.48 | -0.63 | -6.7% |
| 7000 | 7000 | 0 | 8.96 | 8.20 | 8.96 | 9.60 | 9.60 | 9.60 | -0.64 | -6.7% |

FIG. 8

|  |  | STEER AXLE | DRIVE AXLE | | TRAILER AXLE | | | | |
|---|---|---|---|---|---|---|---|---|---|
| LTOTAL (LBS) | LSTEER (LBS) | CRR STEER (KG/TON) | CASE 2 CRR EFFECTIVE (KG/TON) | NO LOAD TRANSFER CRR EFFECTIVE (KG/TON) | CRR TRAILER (KG/TON) | CASE 2 VEHICLE CRR EFFECTIVE (KG/TON) | NO LOAD TRANSFER VEHICLE CRR EFFECTIVE | VEHICLE CRR EFFECTIVE DIFFERENCE (KG/TON) | VEHICLE CRR EFFECTIVE DIFFERENCE (%) | ESTIMATED FUEL SAVINGS (%) |
| 34000 | 12000 | 7.8 | 8.2 | 8.2 | 6.0 | 7.2 | 7.2 | 0.0 | 0.0% | 0.0% |
| 33000 | 12000 | 7.8 | 8.2 | 8.2 | 6.0 | 7.2 | 7.2 | 0.0 | 0.0% | 0.0% |
| 32000 | 12000 | 7.8 | 8.2 | 8.2 | 6.0 | 7.2 | 7.2 | 0.0 | 0.0% | 0.0% |
| 31000 | 12000 | 7.8 | 8.3 | 8.3 | 6.1 | 7.3 | 7.3 | 0.0 | 0.0% | 0.0% |
| 30000 | 12000 | 7.8 | 8.3 | 8.3 | 6.1 | 7.3 | 7.3 | 0.0 | 0.0% | 0.0% |
| 29000 | 12000 | 7.8 | 8.3 | 8.3 | 6.1 | 7.3 | 7.3 | 0.0 | 0.0% | 0.0% |
| 28000 | 12000 | 7.8 | 8.4 | 8.4 | 6.1 | 7.3 | 7.4 | 0.0 | -0.1% | 0.0% |
| 27000 | 12000 | 7.8 | 8.4 | 8.4 | 6.2 | 7.4 | 7.4 | 0.0 | -0.1% | 0.0% |
| 26000 | 12000 | 7.8 | 8.4 | 8.4 | 6.2 | 7.4 | 7.4 | 0.0 | -0.1% | 0.1% |
| 25000 | 12000 | 7.8 | 8.4 | 8.5 | 6.2 | 7.4 | 7.5 | 0.0 | -0.2% | 0.1% |
| 24000 | 12000 | 7.8 | 8.4 | 8.5 | 6.3 | 7.5 | 7.5 | 0.0 | -0.3% | 0.1% |
| 23000 | 12000 | 7.8 | 8.4 | 8.6 | 6.3 | 7.5 | 7.5 | 0.0 | -0.4% | 0.2% |
| 22000 | 12000 | 7.8 | 8.4 | 8.6 | 6.3 | 7.5 | 7.6 | 0.0 | -0.5% | 0.2% |
| 21000 | 12000 | 7.8 | 8.5 | 8.7 | 6.4 | 7.5 | 7.6 | -0.1 | -0.6% | 0.3% |
| 20000 | 12000 | 7.8 | 8.5 | 8.7 | 6.4 | 7.6 | 7.6 | -0.1 | -0.8% | 0.3% |
| 19000 | 12000 | 7.8 | 8.6 | 8.8 | 6.4 | 7.5 | 7.7 | -0.1 | -0.9% | 0.3% |
| 18000 | 12000 | 7.8 | 8.2 | 8.8 | 6.5 | 7.4 | 7.7 | -0.2 | -0.9% | 0.3% |
| 17000 | 12000 | 7.8 | 8.2 | 8.9 | 6.5 | 7.5 | 7.7 | -0.2 | -0.8% | 0.9% |
| 16000 | 12000 | 7.8 | 8.3 | 8.9 | 6.6 | 7.6 | 7.8 | -0.2 | -2.8% | 0.9% |
| 15000 | 12000 | 7.8 | 8.4 | 9.0 | 6.6 | 7.6 | 7.8 | -0.2 | -2.8% | 0.9% |
| 14000 | 12000 | 7.8 | 8.4 | 9.0 | 6.7 | 7.6 | 7.9 | -0.2 | -2.7% | 0.9% |
| 13000 | 12000 | 7.8 | 8.5 | 9.1 | 6.7 | 7.6 | 7.9 | -0.2 | -2.6% | 0.9% |
| 12000 | 12000 | 7.8 | 8.6 | 9.2 | 6.8 | 7.7 | 7.9 | -0.2 | -2.6% | 0.8% |
| 11000 | 12000 | 7.8 | 8.6 | 9.3 | 6.8 | 7.7 | 8.0 | -0.2 | -2.5% | 0.8% |
| 10000 | 12000 | 7.8 | 8.7 | 9.4 | 6.9 | 7.8 | 8.0 | -0.2 | -2.4% | 0.8% |
| 9000 | 12000 | 7.8 | 8.8 | 9.5 | 6.9 | 7.9 | 8.0 | -0.2 | -2.4% | 0.8% |
| 8000 | 12000 | 7.8 | 8.8 | 9.5 | 6.9 | 7.9 | 8.0 | -0.2 | -2.3% | 0.8% |
| 7000 | 12000 | 7.8 | 9.0 | 9.6 | 7.0 | 7.9 | 8.1 | -0.2 | -2.1% | 0.7% |

FIG. 9

VEHICLE FUEL ECONOMY BY OPTIMIZING EFFECTIVE TIRE ROLLING RESISTANCE

This is a continuation application of application U.S. application Ser. No. 14/377,067, filed Aug. 6, 2014, which is a national stage entry of Application No. PCT/US12/24690 filed Feb. 10, 2012.

FIELD OF THE INVENTION

The subject matter of the present invention relates generally to a vehicle that has axles with tires mounted thereon with at least one axle that is a lift axle, and more specifically, to a method that optimizes the effective tire rolling resistance by adjusting the load on the tires, resulting in an improvement in the fuel economy of the vehicle.

BACKGROUND OF THE INVENTION

Fuel is the largest operating cost for a typical truck fleet, and much effort has gone into improving the fuel economy of heavy trucks. One common configuration for a long-haul tractor trailer is a 6×4 tractor, consisting of one steer axle and two drive axles, pulling a trailer comprising two trailer axles. As a fuel-saving measure the 6×2 tractor has been introduced to the market. The 6×2 tractor consists of a steer axle, a non-driven "tag" axle, and a single drive axle. This eliminates one of the differentials from the drivetrain, simplifies the tag axle, reduces mass and drivetrain friction, and significantly improves fuel economy. However, drive traction is reduced since the number of tires transmitting the engine torque to the road has been reduced by half. This is usually only an issue at very low speeds in low gear on low traction surfaces.

To address this need for greater traction, axle manufacturers have introduced a system based on a 6×2 lift axle. A lift axle is capable of transferring load from the tag axle to the drive axle, increasing traction on the drive tires. The amount of load on the drive axle can be determined, e.g., by sensors. Means known in the art for measuring this load are described by U.S. Pat. No. 5,193,063, col. 6, lines 25 thru 45 and include placing a load cell between the axle and its suspension, placing a strain gauge between the axle and its suspension point, and measuring the pressure in the air springs when they are employed using a pressure transducer. Using suitable means for measuring the load, the tag axle can be lifted until the drive axle load reaches a predetermined value. The system then returns to normal loading based on various criteria. For example, the load may return to normal either when the vehicle speed exceeds a predetermined (low) threshold, a predetermined time passes, or the driver manually turns off the system. The drive axle may be loaded beyond the usual max load of the tires, as permitted by the T&RA tables of "Load and Pressure Adjustments at Reduced Speeds". For example, the drive axle may be loaded to 20,000 lbs or 26,000 lbs at very low speeds for startup traction.

The means used for lifting or lowering the lift axle include hydraulic components, pneumatic components, and mechanical linkages or combinations thereof. For examples of such systems, see U.S. Pat. Nos. 4,854,409; 5,193,063; 5,230,528 and 7,222,867.

By way of further example, FIGS. 1 and 2, and a written description thereof, of U.S. Pat. No. 7,222,867, which is assigned to International Truck Intellectual Property Company, LLC., are reproduced herein. A vehicle 10 is shown in FIG. 1 that is comparable to a 8×4 or 8×2 tractor. Vehicle 10 can be any vehicle configured to haul large and varying loads. Vehicle 10 includes a chassis 12 with front and rear fixed axles 14,16, 18, which in turn have wheels 20 mounted thereon to support chassis 12 above a road surface. Chassis 12 carries a body including a driver cab 22 and a cargo body 24, such as a dump body. Because the load carried by vehicle 10 varies greatly it can be advantageous to lower a supplementary axle to avoid having the vehicle violate per axle loading limitations. Here a lift axle 26 is provided as such a supplementary axle. Those skilled in the art understand that full time use of such an axle raises vehicle operating costs due to increased rolling resistance.

Automatic operation of lift axle 26, or, alternatively, giving indication to an operator of appropriate times to raise or lower lift axle 26, involves other vehicle systems which are schematically illustrated in FIG. 2, which discloses a system for a truck that is comparable to 6×2 tractor. Chassis 12 is equipped with an air suspension system in which air filled bladders (air springs 44) take over much if not all of the support and shock isolation functions of conventional solid springs. Among the advantages of air springs is that the quantity of air in them can be adjusted to maintain chassis 12 at a fixed height. To this end an air delivery system works through a height leveling valve 52. Air pressure in the air spring 44 is thus correlated with vehicle load. A pressure sensor 322 is provided for each air spring 44 circuit and provides the basic data for the determination of axle load. Typically there will be only one such circuit per vehicle, however, other arrangements are possible, including individual control for each air spring and intermediate arrangements, such as the two circuit design illustrated in the figure.

Additional suspension stabilizing linkages 66 are associated with each air spring 44 depending from frame side rails 48. Air lines 62 connect to a compressed air tank 68 installed on chassis 12 between side frame rails 48. An engine 70 provides motive power for chassis 12, driving a propeller shaft 76 by an automatic or semi-automatic transmission 72. Propeller shaft 76 is connected between the transmission 72 and a differential 74 for the single drive axle 16 shown. A tachometer 75 is coupled to propeller shaft 76 and allows the determination of the average rotational velocity of the drive 20 wheels from which vehicle speed is estimated. Lift axle 26 is not driven. Pneumatic positioning cylinders 64 are mounted between chassis 12 and lift axle 26 to raise or lower the lift axle as required by the electronic control system.

Heavy trucks, such as shown in FIG. 1, spend much of their time carrying less-than-maximum weight loads. See FIG. 3 where the percentage of usage time is plotted versus vehicle load. This graph indicates that such trucks carry less than their maximum allowable load about 60% of the time they are used. This can be attributed to the nature of their cargo, i.e. certain fleets are "volume limited" rather than "weight limited" (e.g. wood chip haulers). In addition, many trucks lighten their load progressively over the course of their route (e.g. gasoline tankers). Alternatively, other trucks such as dump or garbage trucks may increase their load progressively.

Accordingly, as the data in FIG. 3 indicates, the majority of trucks on the highway would benefit from a tire rolling resistance optimization scheme that takes into account the load placed on tires. More specifically, a method for optimizing the fuel economy of a vehicle that takes into account the rolling resistance characteristics of a tire and appropriately alters the load on the tire would be beneficial. Such a method that uses equipment already present on the vehicle, such as a lift axle, would be particularly advantageous.

SUMMARY OF THE INVENTION

Aspects and advantages of the invention will be set forth in part in the following description, or may be obvious from the description, or may be learned through practice of the invention.

The present invention includes a method for improving the fuel economy of a vehicle by optimizing effective tire rolling resistance, the method comprising the following steps:

providing a vehicle with at least one principal axle and one lift axle, said axles having tires mounted thereon; and determining whether the total load carried by the vehicle is greater than the sum of maximum allowable axle load multiplied by the number of lift axles added to the minimum allowable axle load necessary multiplied by the number of principal axles; or determining whether the total load carried by the vehicle is less than or equal to the sum of maximum allowable axle load multiplied by the number of lift axles added to the minimum allowable axle load necessary multiplied by the number of principal axles while also being greater than the total number of axles multiplied by the minimum allowable axle load necessary, or determining whether the total load carried by the vehicle is less than or equal to the total number of axles multiplied by minimum allowable axle load necessary.

According to which regime above is found, a lift axle is moved to adjust the loads on the various axles of the vehicle.

The present invention also includes a method for improving the fuel economy of a vehicle by optimizing effective tire rolling resistance, the method comprising the following steps:

providing a vehicle with at least one principal axle and one lift axle, said axles having tires mounted thereon; and determining whether the quantity of the total load carried by the vehicle minus the product of the maximum allowable axle load multiplied by the number of principal axles is greater than the minimum allowable axle load necessary multiplied by the number of lift axles; or determining whether the quantity of the total load carried by the vehicle minus the product of the maximum allowable axle load multiplied by the number of principal axles is less than or equal to the product of minimum allowable axle load multiplied by the number of lift axles while at the same time the total load is greater than or equal to the total number of axles multiplied by the minimum allowable axle load necessary, or determining whether the quantity of the total load carried by the vehicle is less than the total number of axles multiplied by the minimum allowable axle load necessary, or determining whether the quantity of the load carried by the vehicle minus the product of the maximum allowable axle load multiplied by the number of lift axles is less than or equal to the product of the minimum allowable axle load multiplied by the number of principal axles while at the same time the total load is greater than or equal to the total number of axles multiplied by the minimum allowable axle load necessary.

According to which regime above is found, a lift axle is moved to adjust the loads on the various axles of the vehicle.

A system for improving vehicle fuel economy for a vehicle having at least one lift axle and one principal axle, comprising:

tires mounted on the lift and principal axles;

an input device for entering instructions or information;

a memory for storing instructions, data or programs having algorithms;

load sensors for determining the loads on the principal and lift axles;

a lift mechanism for lowering or raising the lift axle;

at least one processing device in communication with said input device, said memory, said load sensors, and said lift mechanism, said processing device configured for receiving measurements indicative of the load placed on the principal and lift axles as well as the total load carried by the vehicle;

executing an algorithm depending on whether the tires on the lift axle have rolling resistance characteristics that are higher, lower or the same as the tires on the principal axle and subsequently sending a signal to the lift mechanism in order to move the lift axle to change the loads placed on the principal and lift axles;

stopping the movement of the lift mechanism once the desired loads on the principal and lift axles have been reached; and, monitoring the total vehicle load over time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5A thru 5D is a flowchart of a method according to another embodiment of the present invention covering a specific application to a 6×2 tractor or equivalent that uses only one drive axle and one tag axle.

FIG. 6 is table of simulated data for an example of the load transfer algorithm for Case 1 where the trailer tires on the lift axle have a lower coefficient of rolling resistance than the drive tires found on the principal or drive axle.

FIG. 7 is a table of simulated data estimating the fuel savings from the Case 1 example shown in the table of FIG. 4.

FIG. 8 is table of simulated data for an example of the load transfer algorithm for Case 2 where the tires on the lift axle have the same or higher coefficient of rolling resistance than the tires found on the principal or drive axle.

FIG. 9 is a table of simulated data estimating the fuel savings from the Case 2 example shown in the table of FIG. 6.

Note that these cases do not have the same reference tires and are not applicable to the same situations.

Figure 11:
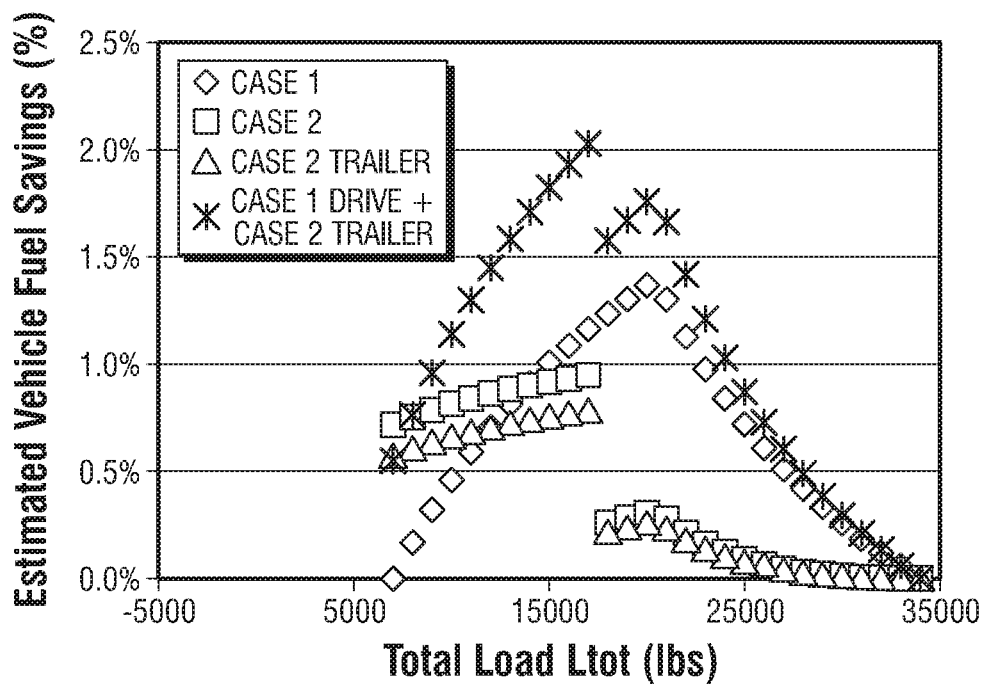

FIG. 11 is a graph showing the estimated vehicle fuel savings for an application of invention to trailer axle only ("Case 2 Trailer") and to both drive and trailer axle ("Case 1 Drive+Case 2 Trailer").

The use of identical or similar reference numerals in different figures denotes identical or similar features.

DETAILED DESCRIPTION OF THE INVENTION

Since tires are responsible for about 30% of the fuel consumption of a typical long haul tractor-trailer, the inventors recognized that an optimization of the effective tire rolling resistance of tires of such a vehicle would lead to an improvement in the fuel economy of the vehicle. The inventors further recognized that tire rolling resistance is non-linear, and tires are more efficient (lower coefficient of rolling resistance) when they are subjected to higher loads. In addition, drive axle tires typically have the highest rolling resistance of any tires on the vehicle. When, for example, a 6×2 tractor is equipped with a lift axle, a tractor can transfer load from the tag (non-driven) axle to the drive axle or vice versa to keep the assembly optimally loaded (typically with the trailer tire at the max legal axle load), thereby increasing vehicle fuel economy. Provisions are made to ensure that the drive tire always has sufficient load to ensure adequate traction; these are detailed below along with an estimation of the tire rolling resistance gains and fuel economy improvements this invention makes possible. It should be noted that this can be accomplished with little alteration to the existing equipment used on many heavy trucks, tractors, or trailers, which makes it convenient and inexpensive.

The present invention provides a method for improving the vehicle fuel economy by optimizing the effective tire rolling resistance of the tires mounted on the vehicle using a lift axle found on the vehicle to adjust the load on the tires. The method does this by considering the rolling resistance characteristics of the tires and implementing an algorithm based on those characteristics that raises or lowers the lift axle to adjust the load placed on each of the tires.

The following terms are defined as follows for this disclosure:

"Vehicle" is any type of car, light truck, heavy truck or anything else that rolls on a road surface and includes, but is not limited to, a tractor, trailer or combination thereof.

"Principal axle" is any axle of a vehicle that is chosen to stay stationary with respect to the road surface and may include steer, tag, or drive axles whose load varies significantly with the movement of a lift axle.

"Lift axle" is any axle of a vehicle that is capable of and chosen to move toward or away from the road surface and may include a tag, steer, or drive axle.

"Processing device" includes any form of circuitry, such as a microprocessor or other microcontroller, or digitial signal processor for receiving data from one or more of sensors and performing certain functions therewith as will be further described. In many cases, such a device will also be fitted with memory. As such, "processing device" as used herein may include one or more microprocessors and may include one or more memory devices as well.

There are two cases envisioned. In the first, more common case, different tires would be mounted on the lift and the principal axles; for example, in the case where the lift axle is tag axle, it would be mounted with trailer tires and in the case where the principal axle is a drive axle, it would be mounted with drive tires. Trailer tires typically have a lower coefficient of rolling resistance than drive tires. This situation is designated as Case 1.

In the second case, the tires on the lift axle have a coefficient of rolling resistance that is equal to or greater than the coefficient of rolling resistance of the tires mounted on the principal axle. This may occur, for example, when the same tires are mounted on both drive and lift axles of a 6×2 tractor. This situation is designated as Case 2. Efficiencies may still be made in this case due to the non-linear nature of tire rolling resistance, which causes two tires operating at half load to be less efficient than one tire operating at full load, for example. This is due to the power law relationship between tire load and rolling resistance. A commonly used description known in the art of the evolution of the rolling resistance coefficient of a tire Crr with load is given below by Equation 1:

$$C_{rr}(z) = C_{rr}(z_{ref})\left(\frac{z}{z_{ref}}\right)^{-0.1}; \qquad \text{Eq. 1}$$

where z is the load and $z_{ref}$ is the reference load at which the rolling resistance coefficient was measured.

In the following paragraphs the algorithms of the present invention are outlined for distributing the load between the lift and principal axles in order to optimize the fuel economy of the vehicle. The present invention involves the load transfer for fuel economy; this is accomplished by loading the tire which is operating most efficiently as much as possible, i.e. increase the load on the tires having the lowest coefficient of rolling resistance. A method for using these algorithms is represented by the flow chart contained in FIGS. 4A-4D and 5A-5D. It comprises a first step 100, 200 that includes determining whether a Case 1 or Case 2 scenario is present, that is to say, whether the rolling resistance characteristics of the tires mounted on a lift axle are lower than those on a principal axle for the general case application, and for the case of a 6×2 tractor or equivalent application, whether the rolling resistance characteristics for the tires mounted on the tag axle are lower than those on a drive axle.

It should be noted that these algorithms are based on the presumption that the load taken by the front steer axle is largely fixed and dependent on the configuration of the vehicle, therefore its effect was considered to be negligible. Therefore, reference to the "total vehicle load" herein including the claims with respect to the algorithms does not include the load carried by the front steer axle of a vehicle when said steer axle load does not vary significantly with movement of a lift axle. However, "total vehicle load" as used herein including the claims does include the load carried by the front steer axle of a vehicle when said steer axle load does vary significantly with movement of the lift axle.

Figure 1:
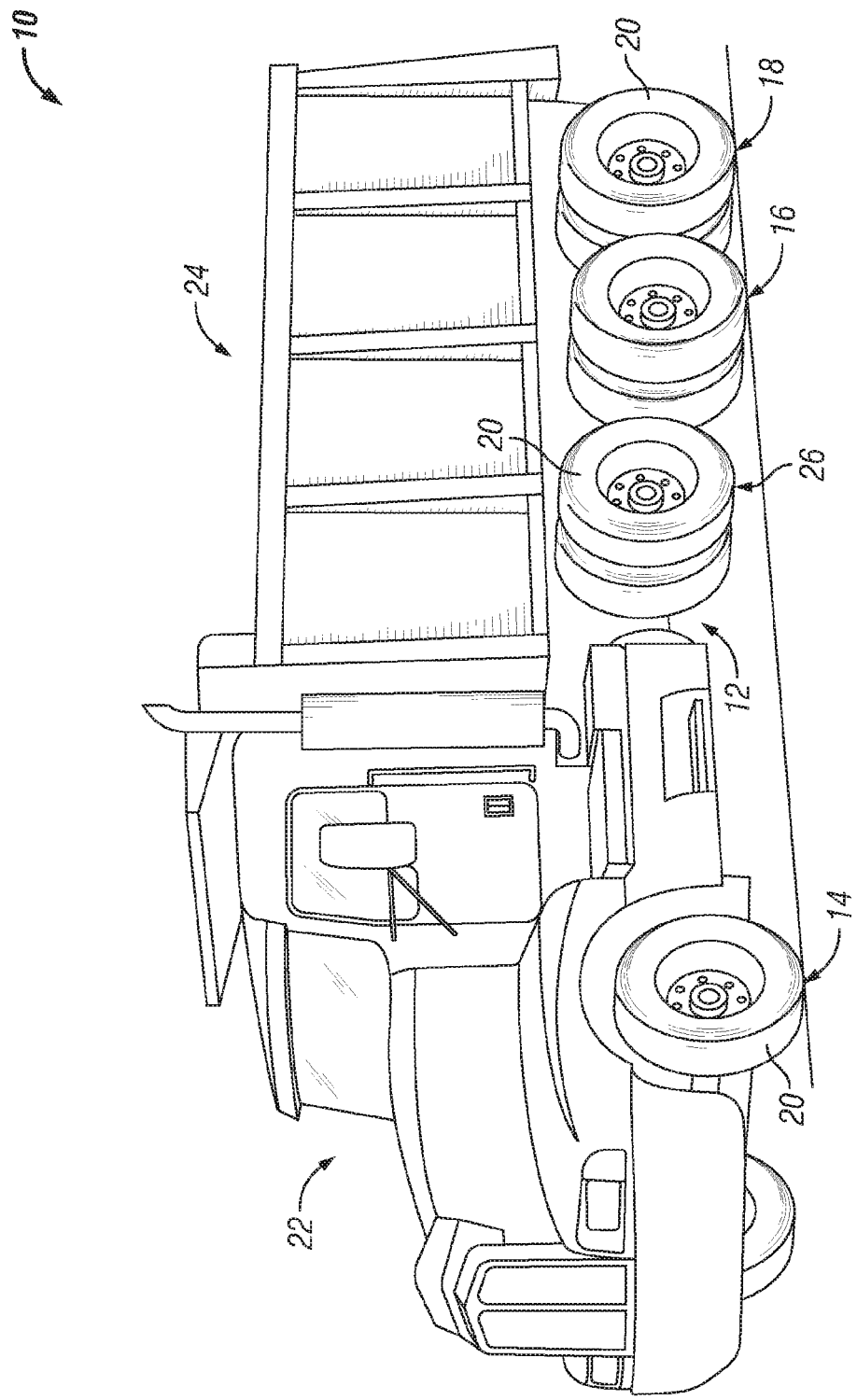
FIG. 1 is a perspective view of a vehicle equipped with a lift axle.
Figure 2:
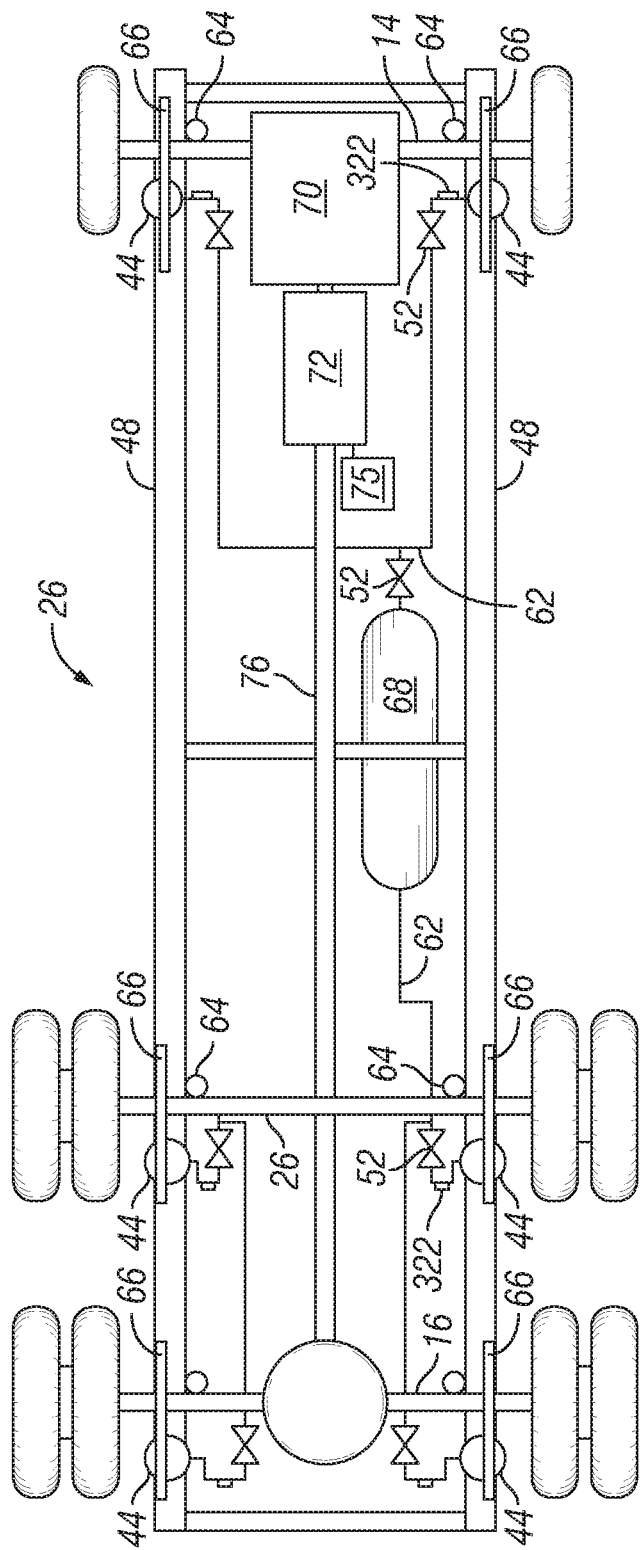
FIG. 2 is a top schematic view of a truck chassis equipped with a lift axle.
Figure 3:
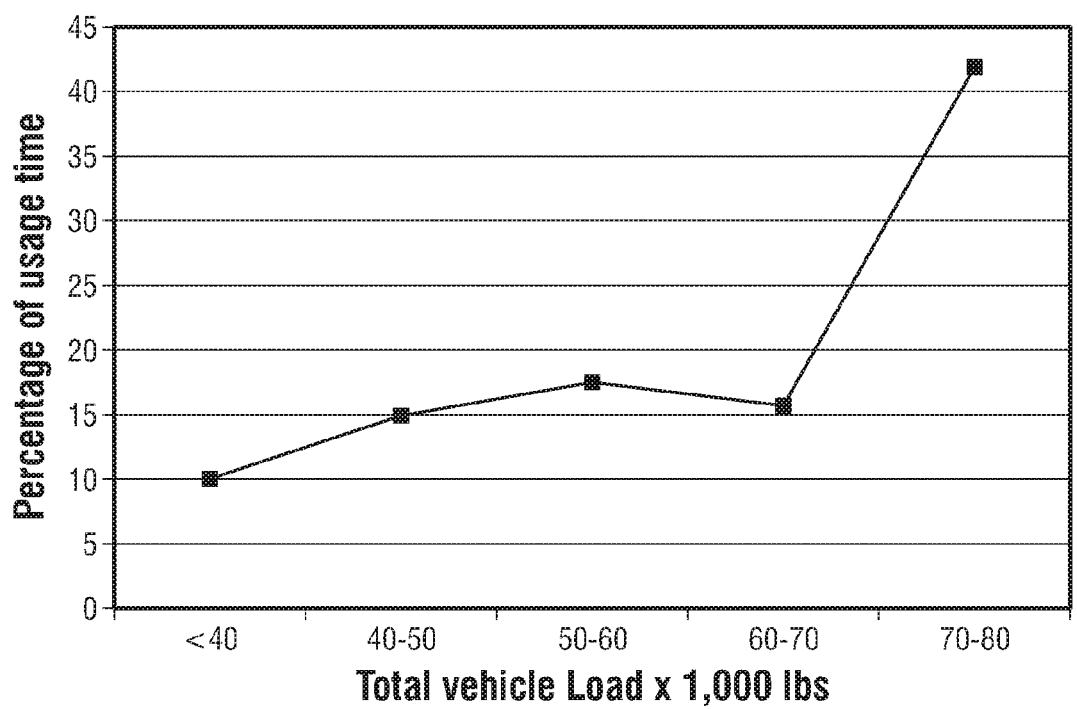
FIG. 3 is a plot showing the percentage of usage time at various loads for 6×4 highway tractor/trailers.
Figure 4A:
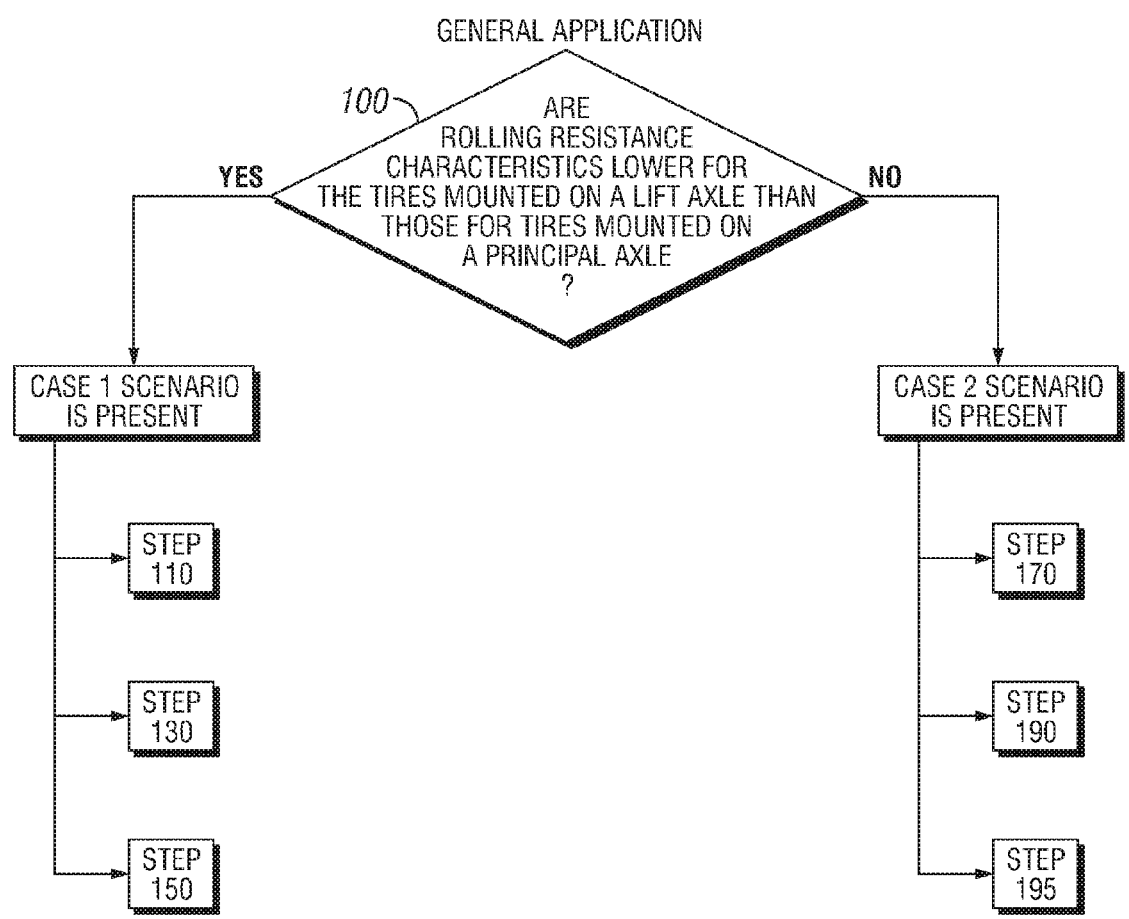
FIG. 4A thru 4D is a flowchart of a method according to a first embodiment of the present invention covering any general application using one or more principal axles and one or more lift axles.
Figure 4B:
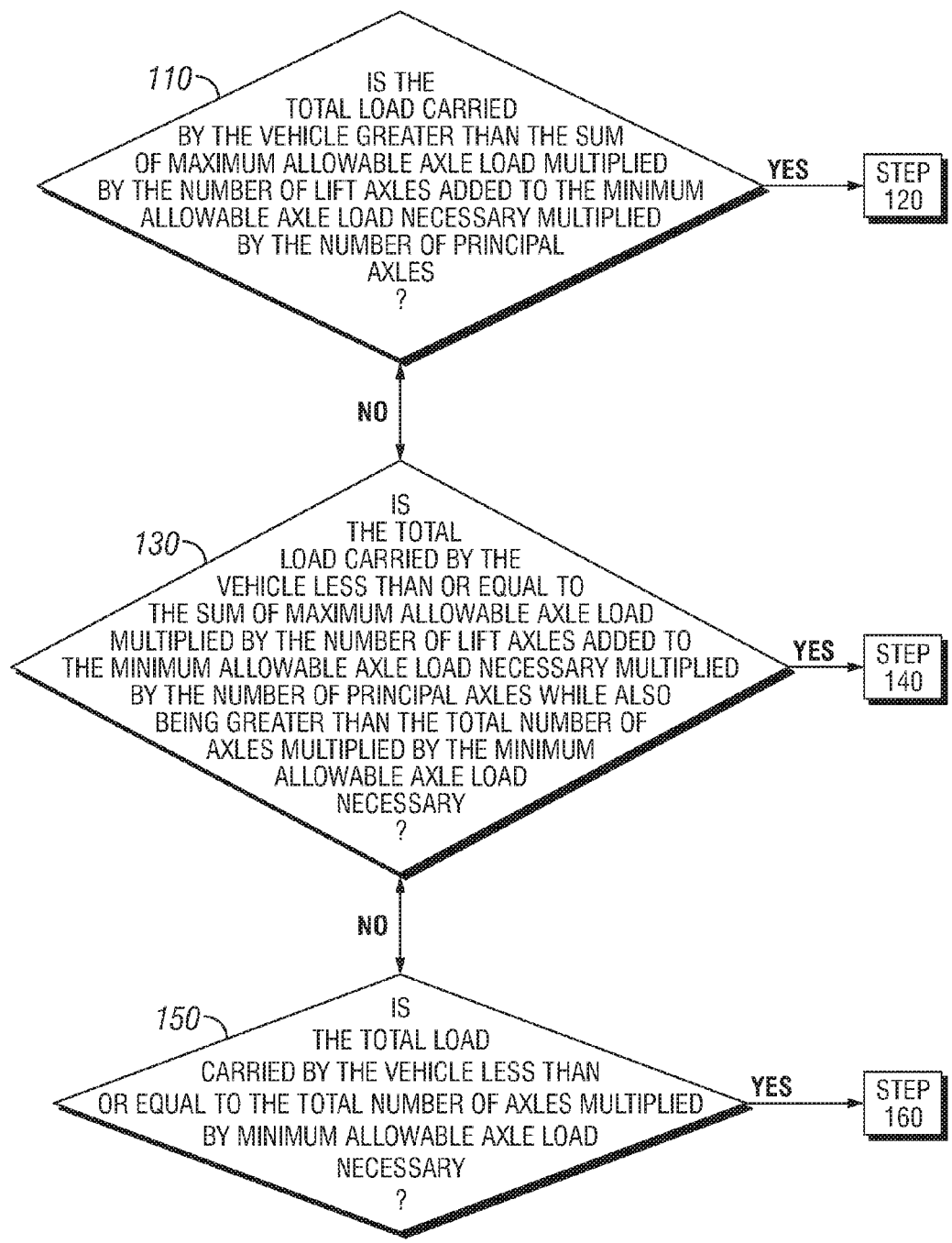
Figure 4C:
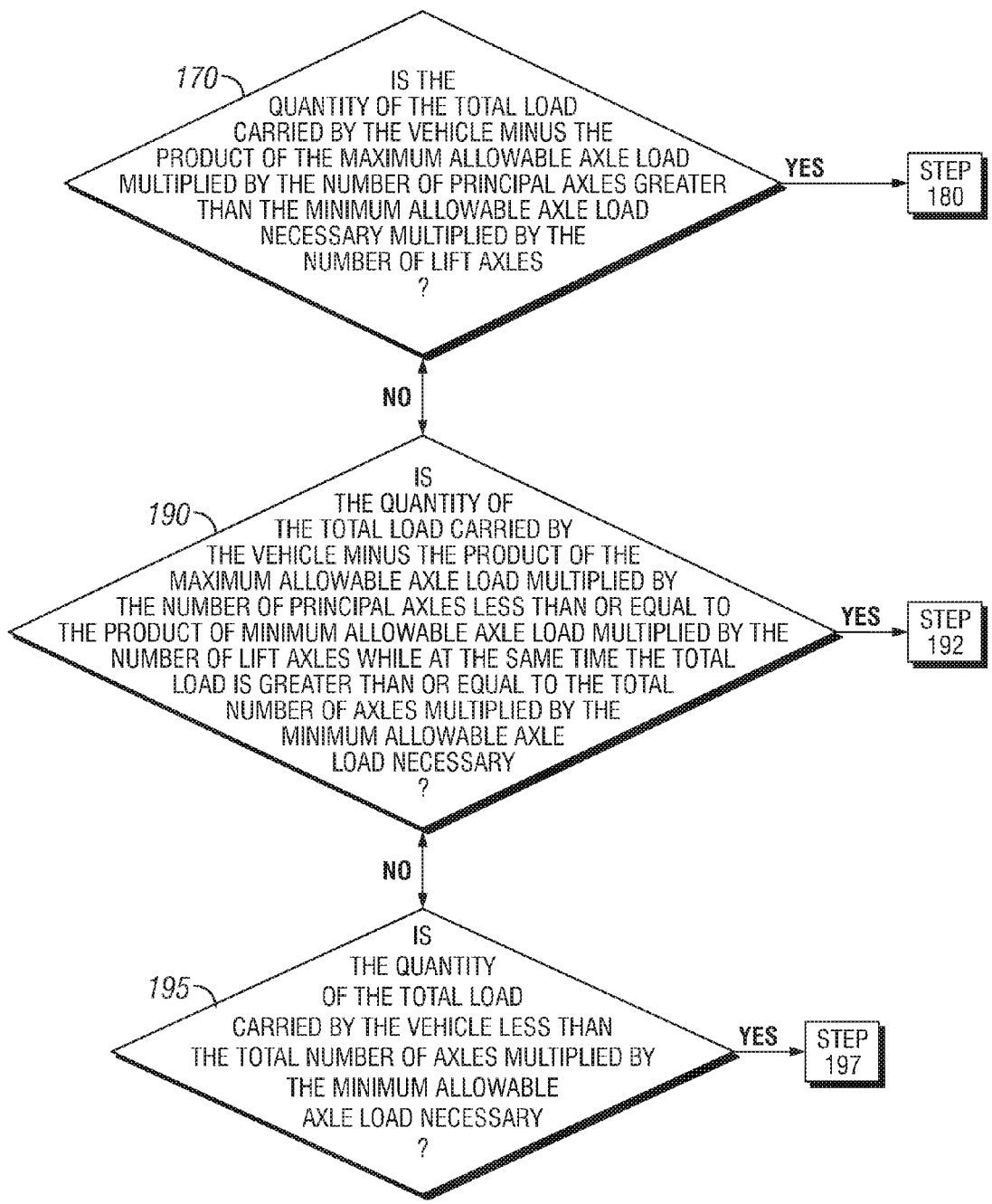
Figure 4D:
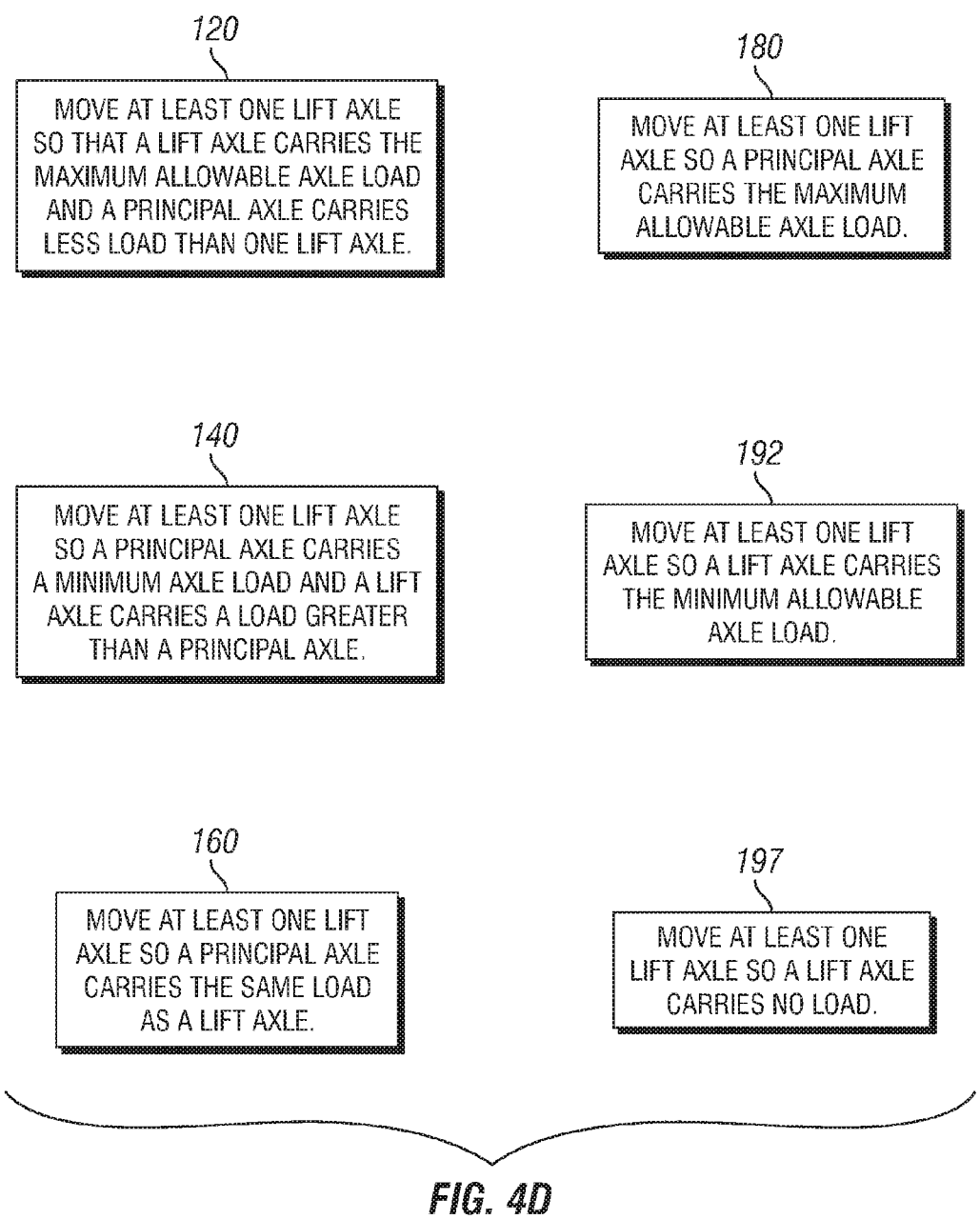

For Case 1, the algorithm unloads the principal axle, keeping the lift axle as fully loaded as possible and allowing it to operate more efficiently. When the principal axle load has reached the threshold desired for maintaining traction on the principal axle, which is often the drive axle, the lift axle load is then reduced. As the load reduces still further, if and when the lift axle, which is often the tag axle, reaches a threshold load, the load is then shared evenly between both axles. The algorithm for determining the load on the lift and the principal axle is as follows:

If Ltotal>(Lmax)*Nlift+(Lmin)*Nprincipal then the lift axle(s) is (are) moved until Llift=Lmax and Lprincipal=[Ltotal−(Lmax*Nlift)]/Nprincipal (this generally relates to steps 110 and 120 of the flowcharts found in FIGS. 4A, 4B and 4D), If Ltotal<=(Lmax)*Nlift+(Lmin)*Nprincipal but is greater than Ntot*Lmin then the lift axle(s) is (are) moved until Llift=[Ltotal−Lmin*Nprincipal]/Nlift and Lprincipal=Lmin (this generally relates to steps 130 and 140 of the flowcharts found in FIGS. 4A, 4B and 4D), If Ltotal<=Ntot*Lmin then the lift axle(s) is (are) moved until Lprincipal=Llift=Ltotal/Ntot (this generally relates to steps 150 and 160 of the flowcharts found in FIGS. 4A, 4B and 4D), where Lmax=Maximum allowable axle load, Lmin=Minimum allowable principal axle load required for traction, cornering, etc., Ltotal=Measured total load on all axles, Llift=Desired load on the lift axle, Lprincipal=Desired load on the principal axle, Nlift=the number of lift axles on the vehicle, Nprincipal=the number of principal axles on the vehicle, and Ntot is total number of principal and lift axles added together.

Figure 5A:
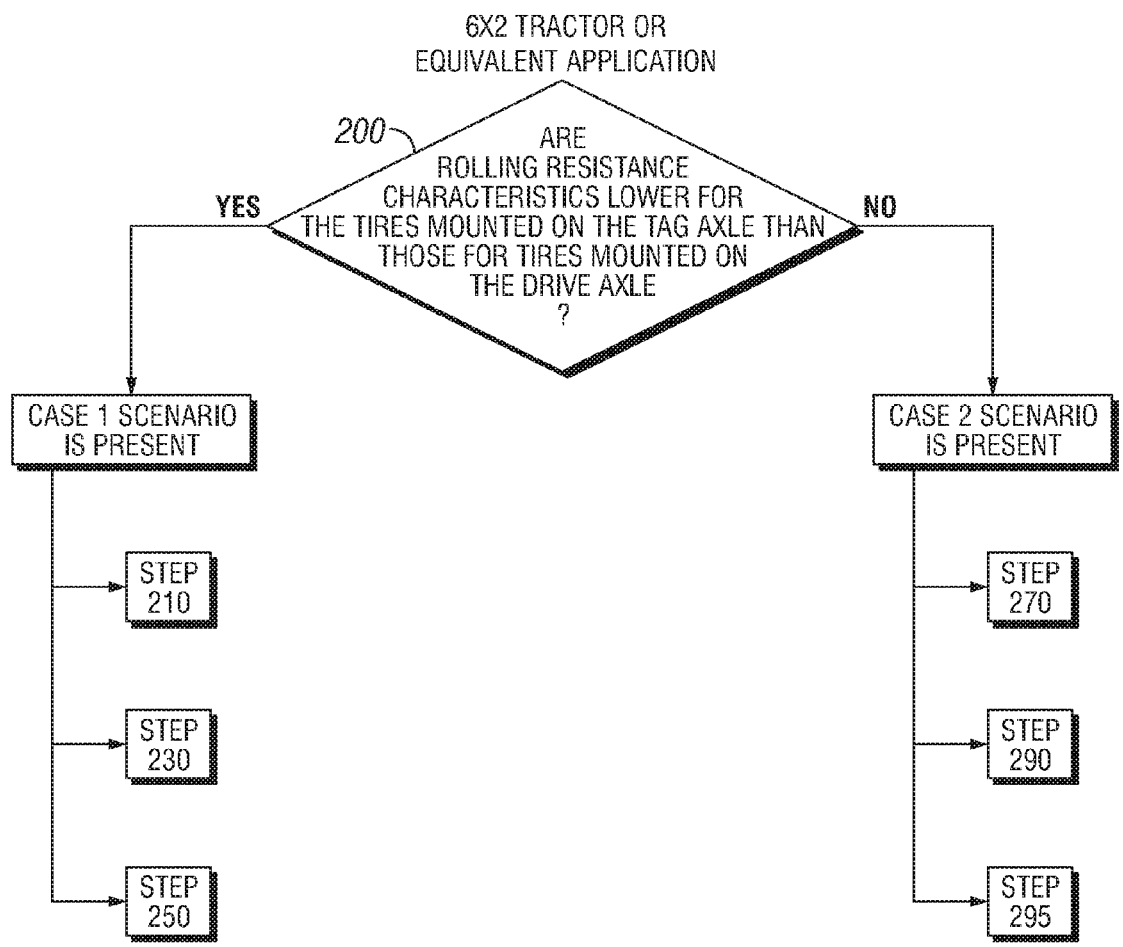
Figure 5B:
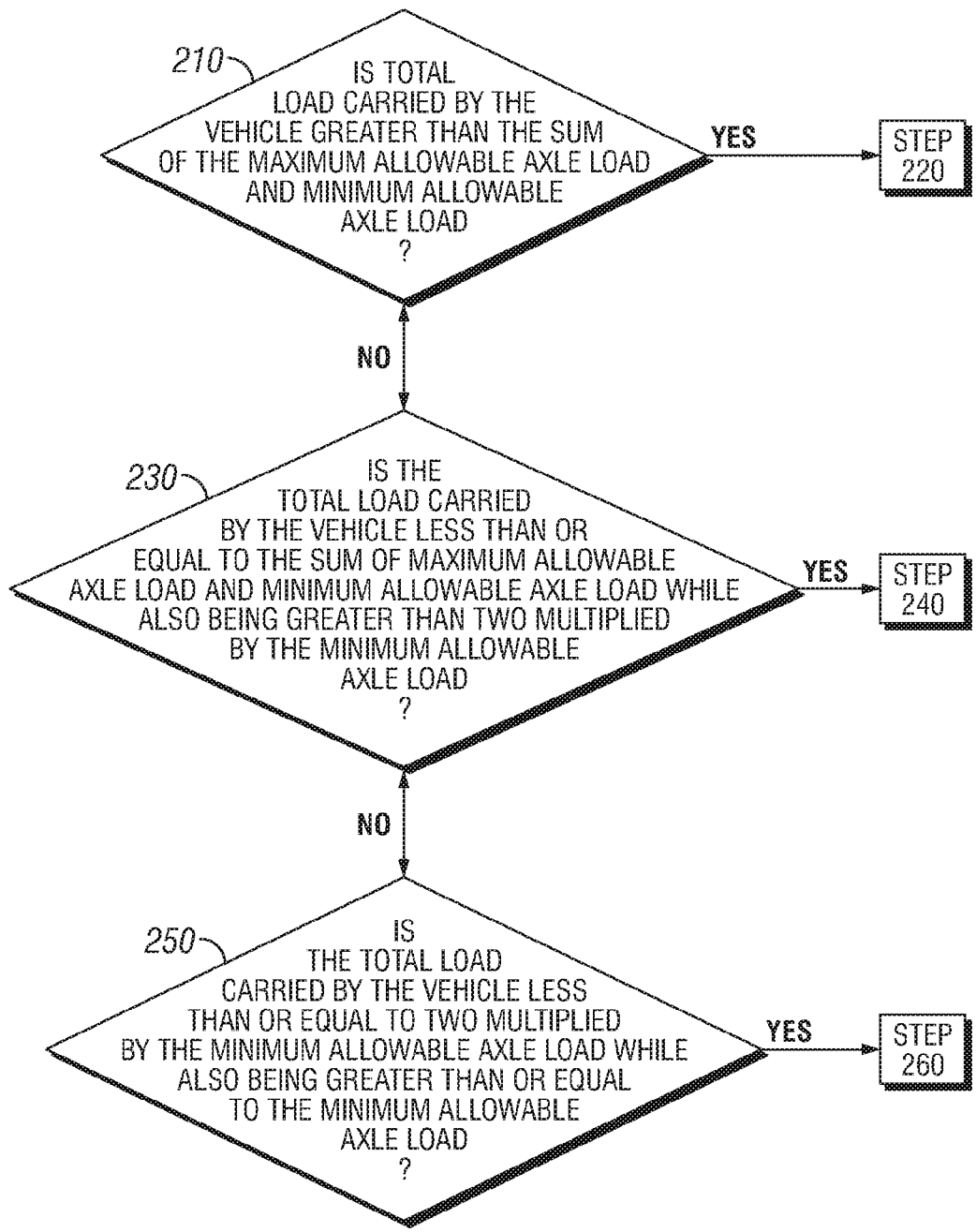

Of course, most scenarios involve the use of a 6×2 tractor, or equivalent, that has only one drive axle as the principal axle and one tag axle as the lift axle. In such an application, Nlift=1, Nprincipal=1 and Ntot=2. Then the above algorithm simplifies to the following:

If Ltotal>Lmax+Lmin then the tag axle is moved until Ltag=Lmax and Ldrive=Ltotal−Lmax (this generally relates to steps 210 and 220 of the flowcharts found in FIGS. 5A, 5B and 5D), If Ltotal<=Lmax+Lmin but is greater than 2*Lmin then the tag axle is moved until Ltag=Ltotal−Lmin and Ldrive=Lmin (this generally relates to steps 230 and 240 of the flowcharts found in FIGS. 5A, 5B and 5D), If Ltotal<=2*Lmin and Ltotal>=Lmin then the tag axle is moved until Ldrive=Ltag=Ltotal/2 (this generally relates to steps 250 and 260 of the flowcharts found in FIGS. 5A, 5B and 5D), where Lmax=Maximum allowable axle load, Lmin=Minimum allowable drive axle load required for traction, cornering, etc., Ltotal=Measured total load on all axles, Ltag=Desired load on the tag axle and Ldrive=Desired load on the drive axle. Moving the tag axle until the drive and tag axles have the same load is preferable at very low vehicle loads as compared to lifting off the lift axle entirely since the penalty of increasing the load on the drive tires, which have higher rolling resistance coefficients than the tires on the tag axle, is greater than the benefit of improving efficiency by increasing the load on the drive tires.

This algorithm is illustrated in FIG. 6 for use with a 6×2 tractor and associated trailer. For purposes of example the drive and trailer rolling resistance values (8.2 Kg/ton and 6.0 Kg/ton respectively) were taken from the baseline scenario from the NTHSA/EPA proposed fuel efficiency standards (see Draft Regulatory Impact Analysis, "Proposed Rulemaking to Establish Greenhouse Gas Emissions Standards and Fuel Efficiency Standards for Medium- and Heavy-Duty Engines and Vehicles", EPA-420-D-10-901, October 2010.). The maximum axle load Lmax was taken to be 17,000 lbs, corresponding to the typical maximum legal axle load. Similarly, the minimum axle load was taken to be 3500 lbs corresponding to a typical empty trailer load. Total load range is twice the minimum axle load to twice the maximum axle load. Other values of Lmax, Lmin and tire rolling resistance can be selected as appropriate to conditions.

The reduction in tire rolling resistance as a function of Ltotal is shown for Case 1 and compared with the usual vehicle configuration in which there is no load transfer between the axles. At each total load Ltot, the algorithm determines the load Ldrive and Ltag for the two axles. The tire rolling resistance coefficient is then corrected for the actual tire load using Equation 1. The effective rolling resistance for the combined assembly is calculated by multiplying each axle load by its corrected tire rolling resistance coefficient to find the rolling resistance force. These forces are added for the two axles and then divided by the total load to obtain the effective rolling resistance coefficient for the assembly. The difference in the effective rolling resistance coefficient is the displayed in absolute terms and as a percentage.

In FIG. 7, an estimate of the vehicle fuel savings that Case 1 offers is provided. The methodology for this estimate is to determine total vehicle rolling resistance by calculating the rolling resistance forces for each axle and dividing by the total load of the vehicle. This calculation used the baseline rolling resistance coefficient from the NTHSA/EPA proposed fuel efficiency standards for the steer tire (7.8 Kg/ton). A constant load Lsteer of 12,000 lbs on the steer axle is assumed as well as an equal load on the drive and trailer assemblies. The effective rolling resistance coefficient of the entire vehicle is reported as a function of Ltotal for both Case 1 and for the usual case of no load transfer. Estimated fuel savings are taken to be 30% of this percentage difference (this assumption is contained in Barand, J., Bokar, J., "Reducing Tire Rolling Resistance to Save Fuel and Lower Emissions", presented at SAE World Congress and Exhibition, SAE 2008-01-0154, Detroit. 2008), based upon the typical contribution of tires to overall vehicle fuel consumption.

Turning now to Case 2, an algorithm is provided that unloads the lift axle, keeping the principal axle as fully loaded as possible and allowing it to operate more efficiently as indicated by Equation 1. When the lift axle load drops below a certain threshold such as the minimum load allowed for an axle, the principal axle is incrementally decreased until the total load reaches the maximum allowable load per axle, at which time the lift axle is lifted completely off of the ground and the entire load is supported by the principal axle alone. This case has the advantage of improving traction at all speeds and improving the wear profile. The algorithm for determining the load on the lift and the principal axles is as follows for a case where the number of lift axles is equal to or less than the number of principal axles:

Using the definitions for the following variables:
Lmax=Maximum axle load
Lmin=Minimum axle load for traction, cornering, etc.
Ltotal=Measured total load on all axles
Llift=Desired load on lift axle
Lprincipal=Desired load on principal axle
Nprincipal=Number of principal axles
Nlift=Number of lift axles
Ntot=Nprincipal+Nlift The load is defined by the following procedure:
If Ltotal−(Lmax)*Nprincipal>Lmin*Nlift, then the lift axle(s) is (are) moved until Lprincipal=Lmax and Llift=[Ltotal−(Lmax*Nprincipal)]/Nlift (this generally relates to steps 170 and 180 of the flowcharts found in FIGS. 4A, 4C and 4D); If Ltotal−Lmax*Nprincipal<=Lmin*Nlift, and if Ltotal>=Ntot*Lmin, then the lift axle(s) is (are) moved until Lprincipal=Ltotal−(Lmin*Nlift)/Nprincipal and Llift=Lmin (this generally relates to steps 190 and 192 of the flowcharts found in FIGS. 4A, 4C and 4D);

If Ltotal<Ntot*Lmin, then Lprincipal=Ltotal/Nprincipal and Llift=0; that is to say that the lift axles are lifted from the ground (this generally relates to steps 195 and 197 of the flowcharts found in FIGS. 4A, 4C and 4D).

For rare cases where the number of principal axles is less than the number of lift axles and the rolling resistance characteristics of the tires mounted on the lift axles is the same as those of the tires mounted on the principal axles, then the goal is to load the lift axles as much as possible and the highest loading regime and the associated movement step for Case 2 would be similar to steps 110 and 120 for a Case 1 scenario above, and the intermediate loading regime and associated movement step for a Case 2 scenario that correspond to steps 190 and 192 above, is as follows:

If Ltotal−Lmax*Nlift<=Lmin*Nprincipal and if Ltotal>=Ntot*Lmin, then the lift axle(s) is (are) moved until Llift=Lmax and Lprincipal=[Ltotal−(Lmax*Nlift)]/Nprincipal (these steps are not shown in flowcharts).

For the same rare case where the number of principal axles is less than the number of lift axles, then the bottom loading regime and associated movement step for a Case 2 scenario that correspond to steps 195 and 197 above, is as follows:

If Ltotal<Ntot*Lmin, then Llift=Ltotal/Nlift and Lprincipal=0, that is to say that a lift axle is moved until there is no load on a principal axle (these steps are not shown in the flowcharts).

Figure 5C:
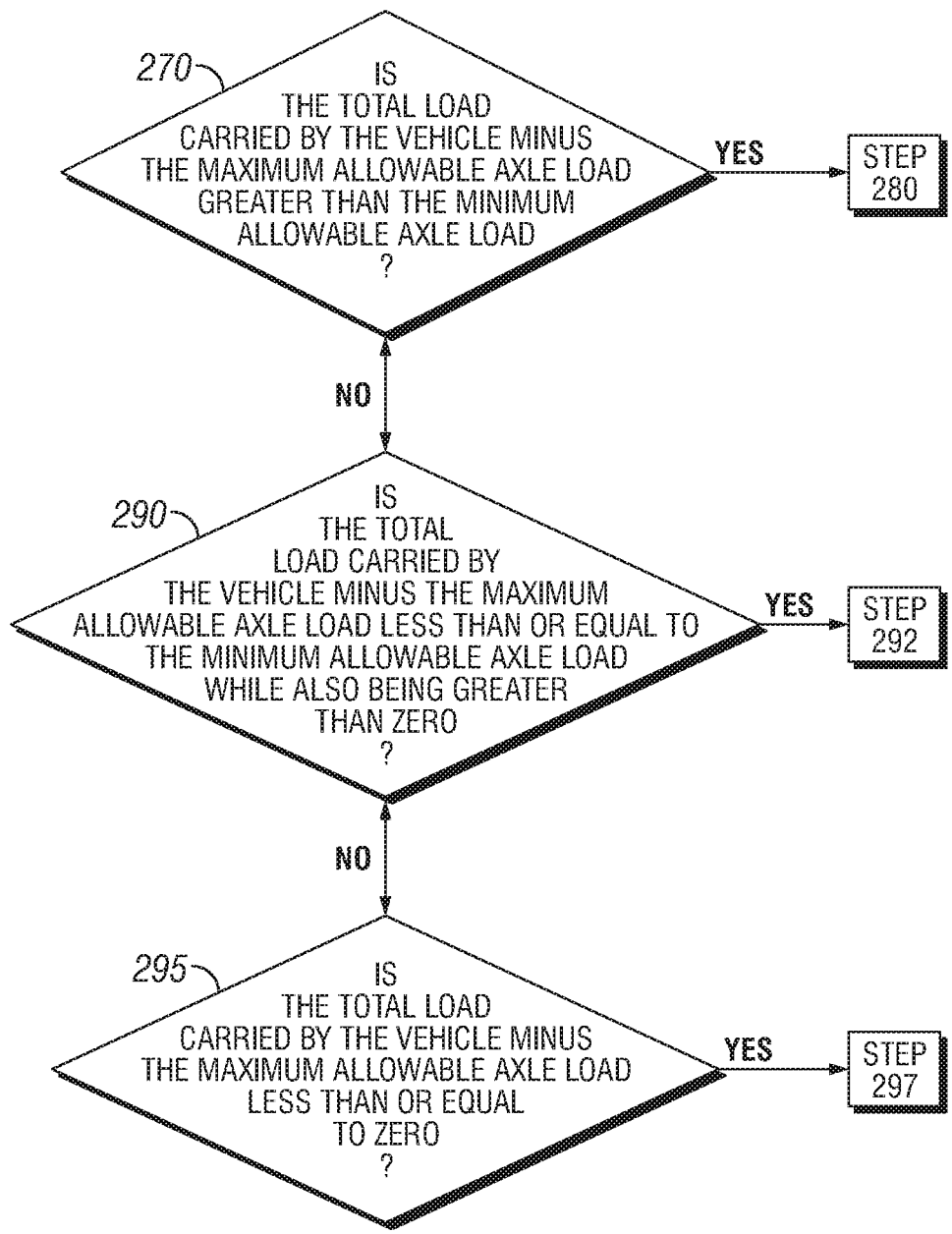

Again, most scenarios involve the use of a 6×2 tractor, or equivalent, that has only one drive axle as the principal axle and one tag axle as the lift axle. In such an application, Nlift=1, Nprincipal=1 and Ntot=2. Then the above algorithm that covers the scenario where the number of lift axles is less than or equal to the number of lift axles simplifies to the following using the definitions for the following variables:

Lmax=Maximum axle load
Lmin=Minimum tag axle load
Ltotal=Measured total load on tag+drive axle
Ltag=Desired load on tag axle
Ldrive=Desired load on drive axle The load is defined by the following procedure:

If Ltotal−Lmax>Lmin, then the tag axle is moved until Ldrive=Lmax and Ltag=Ltotal−Lmax (this generally relates to steps 270 and 280 of the flowcharts found in FIGS. 5A, 5C and 5D);

If Ltotal−Lmax<=Lmin, and if Ltotal−Lmax>0, then the tag axle is moved until Ldrive=Ltotal−Lmin and Ltag=Lmin (this generally relates to steps 290 and 292 of the flowcharts found in FIGS. 5A, 5C and 5D and keeping the load on the tag axle at Lmin helps prevent undesirable wear profiles);

If Ltotal−Lmax<=0, Ldrive=Ltotal and Ltag=0; that is to say the tag axle is lifted off the ground (this generally relates to steps 295 and 297 of the flowcharts found in FIGS. 5A, 5C and 5D).

This algorithm is illustrated in FIG. 8 for a 6×2 tractor application. In keeping with the scenario, the drive and tag rolling resistance values were taken to both be the baseline drive tire from the NTHSA/EPA proposed fuel efficiency standards (8.2 Kg/ton) (see Draft Regulatory Impact Analysis, "Proposed Rulemaking to Establish Greenhouse Gas Emissions Standards and Fuel Efficiency Standards for Medium- and Heavy-Duty Engines and Vehicles", EPA-420-D-10-901, October 2010.). The max axle load Lmax was taken to be 17,000 lbs, corresponding to typical maximum legal axle load. Similarly, the minimum axle load was taken to be 3500 lbs corresponding to a typical empty trailer load. Total load range is twice the minimum axle load to twice the maximum axle load. Other values of Lmax, Lmin and tire rolling resistance can be selected as appropriate to conditions.

As in Case 1, the reduction in tire rolling resistance as a function of Ltotal is shown for Case 2 and compared with the usual vehicle configuration in which there is no load transfer between the axles. At each total load Ltot, the algorithm determines the load Ldrive and Ltag for the two axles. Note that in Case 2 the tag axle is lifted off the ground at a total axle load Ltot=17,000 lbs. The tire rolling resistance coefficient is then corrected for the actual tire load using equation 1. The effective rolling resistance for the combined assembly is calculated by multiplying each axle load by its corrected tire rolling resistance coefficient to find the rolling resistance force. These forces are added for the two axles and then divided by the total load to obtain the effective rolling resistance coefficient for the assembly. The difference in the effective rolling resistance coefficient is the displayed in absolute terms and as a percentage.

In FIG. 9, an estimate of the vehicle fuel savings that Case 2 offers is given. The methodology and description of the columns are the same as for Table 2 above.

Figure 10:
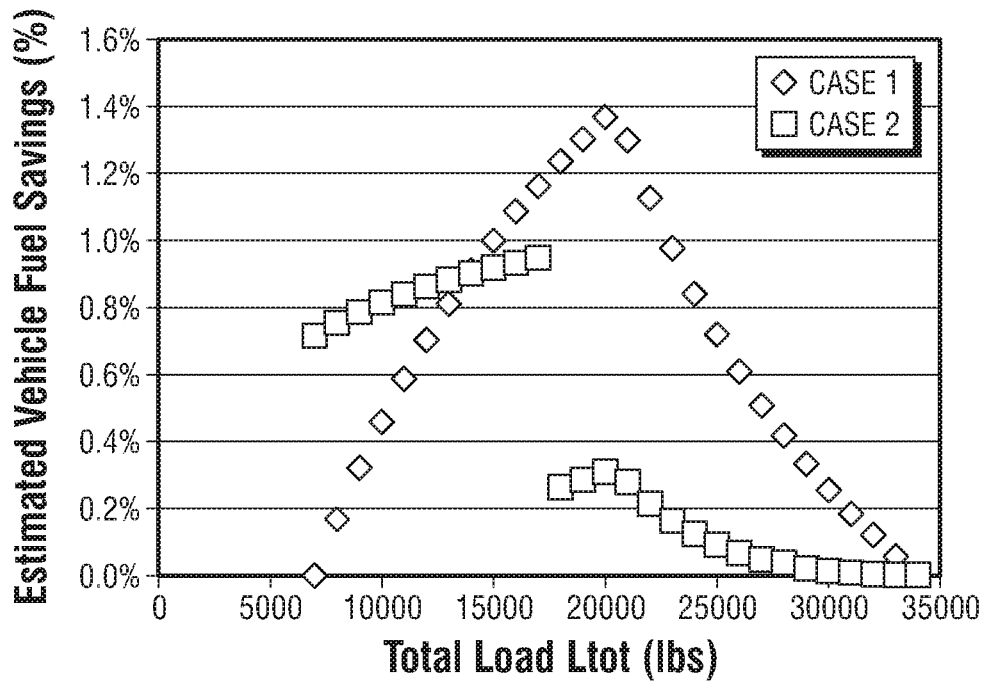
FIG. 10 is a graph showing the estimated vehicle fuel savings for Case 1 and Case 2 examples. The discontinuity in Case 2 occurs when the tag axle is lifted off the ground.

FIG. 10 displays the estimated vehicle fuel savings from Case 1 and Case 2. They vary significantly with vehicle load. In Case 1 the tag axle is a more efficient tire and the load is transferred to this tire progressively. Maximum fuel savings occur when the drive axle has been unloaded as much as permitted and the tag axle is loaded as much as permitted. In Case 2 the load is transferred to the drive tire for simplicity, added traction and improved wear profile of the drive tire. When the rolling resistance of the tag axle is equal to or greater than the drive tire, this is the more efficient scenario. A discontinuity in Case 2 occurs when the tag axle is lifted off the ground, at which point the maximum fuel economy savings are achieved.

It is contemplated that this invention is equally applicable to the vehicle trailer axles, provided they are equipped with a suitable mechanical system and/or electronic control system to accomplish the load transfer. For example, both axles would be equipped with identical trailer tires, as is the usual practice, so that Case 2 would apply. Using the 6.0 Kg/ton rolling resistance coefficient from the baseline scenario from the NTHSA/EPA proposed fuel efficiency standards for trailer tires, we can apply the identical calculations detailed in Table 3 and Table 4 to obtain a Case 2 estimate for the trailer axle. This is shown as "Case 2 Trailer" on FIG. 11 along with the data previously presented in FIG. 10, for comparison. It can be seen that the gains are somewhat less than with the drive tires used in Case 2, due to the greater efficiency (lower Crr) of the trailer tires.

Finally, the estimate for trailer axles can be combined with the Case 1 scenario for the drive axle (the most likely scenario in practice) to estimate the gains for applying this invention to both tractor and trailer axles simultaneously. As can be seen, gains of between 1% and 2% are expected over a large section of the operating load of a typical heavy truck, which is a significant amount of savings for those who routinely operate such vehicles.

These algorithms can be used by an operator, mechanic or other worker associated with vehicles of any type, including heavy trucks either manually or automatically by entering data into a program that is executed by a processing device such as an electronic control system such as that disclosed by U.S. Pat. No. 7,222,867, the contents of which are incorporated herein by reference in its entirety.

A vehicle electronic control system is a generalization of applications of contemporary digital networks to motor vehicles, and may advantageously be based on the Society of Automotive Engineers SAE J1939 standard for controller area networks. An SAE J1939 compliant bus interconnects a plurality of controllers provided for primary vehicle functions. Among these controllers are an engine controller, a transmission controller (for automatic and semi-automatic equipped vehicles), an electronic control system controller (ESC) and, potentially, a stability and height (suspension) controller. The ESC may also connect with a SAE J1708 bus over which it communicates with a group of switches which in turn include control switches for positioning a lift axle. The ESC can contain program instructions in its memory for automatic control of the lift axle. The instructions generated by the ESC may be coded as J1939 messages that are broadcast over the bus, and are then decoded and carried out by a solenoid controller that is connected to the bus. Lastly, the solenoid controller generates the actual control signals applied to the solenoids that affect movement of the lift axle.

An exemplary embodiment of a method of the present invention may be implemented in the following manner First, the rolling resistance characteristics of the tires mounted on the lift and principal axles, as consistent with steps 100 and 200 of the flowcharts, are analyzed to see whether a case 1 or case 2 scenario is present. For example, an operator may enter the rolling resistance characteristics of the tires mounted on the principal and lift axles of the vehicle via an input device such as a keyboard, touchscreen, mouse, etc. Also, the number and type of axles on the vehicle may be entered. Alternatively, the tires mounted on the axles of the vehicle may have RFID chips that transmit to an input device such as a receiver the rolling resistance characteristics of each tire which can be stored in memory and the type of axles and number thereof could also be preprogrammed. If this method is being performed manually, then the operator takes a mental note of the rolling resistance characteristics of these tires and the number and types of axles. These and other means known in the art or that will be devised in the art could be used to accomplish steps 100 and 200 of the present invention.

Given this data, the processing device such as an electronic control system or the operator then determines if any sets of tires mounted on the various axles fall into Case 1 or Case 2 categories. If so, then the appropriate algorithms that are stored in memory can be executed by the processing device and can be applied to the appropriate sets of tires depending on their rolling resistance characteristics during the use of the vehicle automatically. Additionally, the system could alert the operator using a telltale sign such as some visual or audio cue sent by an output device that the lift axle should be moved, in which case, the operator can initiate movement of the lift axle by activating a switch. The movement of the lift axle can be based on measurements that are taken continually, periodically, averaged over time or by other means known in the art. When performed manually, readings may be taken by a person such as an operator each time an action is performed where the operator believes a material change in the weight of the vehicle has been affected, such as when a loading or unloading operation has been done. Once the need to move the lift axle has been identified, the lift axle is moved until the suitable loads are applied to the various axles of the vehicle. Steps 110 thru 197 as well as steps 210 thru 297 may be implemented using any of these means just described or by other means known in the art or that will be developed in the art that have the same function.

In many cases, the algorithms will be used where the weight that the vehicle is carrying is decreased over time. It is possible that the algorithms can be used for applications where the weight that the vehicle is carrying is increased over time. Monitoring of the vehicle load can be done by in any manner known in the art or as described previously.

When an automated system is provided in a vehicle in accordance with the present invention, it may be provided by the OEM with the algorithms described herein already programmed into a processing device that is part of an electronic control system. Otherwise, vehicles with electronic control systems may be retrofitted with these algorithms by downloading programs containing the algorithms using some sort of computer readable medium, by downloading them using satellite or other wireless technology, or by other means commonly known in the art.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. For example, the steps contained in the method described herein regarding determining what category the total load of the vehicle falls into may be done in may be executed in any order as long as the appropriate category is eventually found. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle suspension system for improving a fuel economy of a vehicle by optimizing effective tire rolling resistance, the vehicle suspension system comprising:
   an at least one principal axle;
   an at least one lift axle;
   an at least one tire mounted on each of the axles;
   a memory for storing instructions, data or programs having algorithms;
   load sensors for determining a load on each of the principal and lift axles;
   a lift mechanism for lowering or raising the lift axle;
   at least one processing device in communication with said memory, said load sensors, said lift mechanism, said at least one processing device configured for:
   determining whether a total load carried by the vehicle is greater than a sum of maximum allowable axle load multiplied by a number of lift axles added to a minimum allowable axle load necessary multiplied by a number of principal axles; or
   determining whether the total load carried by the vehicle is less than or equal to the sum of maximum allowable axle load multiplied by the number of lift axles added to the minimum allowable axle load necessary multiplied by the number of principal axles while also being greater than the total number of axles multiplied by the minimum allowable axle load necessary, or
   determining whether the total load carried by the vehicle is less than or equal to a total number of axles multiplied by minimum allowable axle load necessary;
   determining that the tires on a lift axle have lower rolling resistance characteristics than the tires on a principal axle; and
   signaling to move said at least one lift axle so as to improve the fuel economy of said vehicle.

2. The vehicle suspension system of claim 1, wherein the total load carried by the vehicle is determined to be greater than the sum of the maximum allowable axle load multiplied by the number of lift axles added to the minimum allowable axle load necessary multiplied by the number of principal axles, said vehicle suspension system further comprising signaling to move at least one lift axle so that a lift axle carries the maximum allowable axle load and a principal axle carries less load than one lift axle.

3. The vehicle suspension system of claim 1, wherein the total load carried by the vehicle is determined to be less than or equal to the sum of maximum allowable axle load multiplied by the number of lift axles added to the minimum allowable axle load necessary multiplied by the number of principal axles while also being greater than the total number of axles multiplied by the minimum allowable axle load necessary, said vehicle suspension system further comprising signaling to move at least one lift axle so a principal axle carries a minimum axle load and a lift axle carries a load greater than a principal axle.

4. The vehicle suspension system of claim 1, wherein the total load carried by the vehicle is determined to be less than or equal to the total number of axles multiplied by the minimum allowable axle load necessary, said vehicle suspension system further comprising signaling to move at least one lift axle so a principal axles carries a load that is the same as a load carried by a lift axle.

5. The vehicle suspension system of claim 1 in which the total number of axles on the vehicle is two, wherein said at least one principal axle is a drive axle and said at least one lift axle is a tag axle, and wherein said at least one processing device of said vehicle suspension system is configured for:
   determining whether the total load carried by the vehicle is greater than the sum of the maximum allowable axle load and minimum allowable axle load; or
   determining whether the total load carried by the vehicle is less than or equal to the sum of maximum allowable axle load and minimum allowable axle load while also being greater than two multiplied by the minimum allowable axle load; or
   determining whether the total load carried by the vehicle is less than or equal to two multiplied by the minimum allowable axle load while also being greater than or equal to the minimum allowable axle load.

6. The vehicle suspension system of claim 5, wherein the total load carried by the vehicle is determined to be greater than the sum of maximum allowable axle load and the minimum allowable axle load, said vehicle suspension system further comprising signaling to move the tag axle until the axle load of the tag axle is the maximum allowable axle load and the axle load of the drive axle is equal to total load carried by the vehicle minus the maximum allowable axle load.

7. The vehicle suspension system of claim 5, wherein the total load carried by the vehicle is determined to be less than or equal to the sum of maximum allowable axle load and minimum allowable axle load while also being greater than two multiplied by the minimum allowable axle load, said vehicle suspension system further comprising signaling to move the tag axle until the tag axle load equals the total load carried by the vehicle minus the minimum axle load and drive axle load equals the minimum allowable axle load.

8. The vehicle suspension system of claim 5, wherein total load carried by the vehicle is determined to be less than or equal to two multiplied by the minimum allowable axle load while also being greater than or equal to the minimum allowable axle load, said vehicle suspension system further comprising signaling to move the tag axle until drive axle load equals the tag axle load.

9. A vehicle suspension system for improving a fuel economy of a vehicle by optimizing effective tire rolling resistance, the vehicle suspension system comprising:
   an at least one principal axle;
   an at least one lift axle;
   an at least one tire mounted on each of the axles;
   a memory for storing instructions, data or programs having algorithms;
   load sensors for determining a load on each of the principal and lift axles;
   a lift mechanism for lowering or raising the lift axle;
   at least one processing device in communication with said memory, said load sensors, said lift mechanism, said at least one processing device configured for:
   determining whether a quantity of a total load carried by the vehicle minus a product of a maximum allowable axle load multiplied by a number of principal axles is greater the minimum allowable axle load necessary multiplied by a number of lift axles; or
   determining whether the quantity of the total load carried by the vehicle minus the product of the maximum allowable axle load multiplied by the number of principal axles is less than or equal to the product of minimum allowable axle load multiplied by the number of lift axles while at a same time the total load is greater than or equal to the total number of axles multiplied by the minimum allowable axle load necessary, or
   determining whether the quantity of the total load carried by the vehicle is less than the total number of axles multiplied by the minimum allowable axle load necessary, or
   determining whether the quantity of the load carried by the vehicle minus the product of the maximum allowable axle load multiplied by the number of lift axles is less than or equal to the product of the minimum allowable axle load multiplied by the number of principal axles while at the same time the total load is greater than or equal to the total number of axles multiplied by the minimum allowable axle load necessary;
   determining that the tires on a lift axle have the same or higher rolling resistance characteristics than the tires on a principal axle; and
   signaling to move said at least one lift axle so as to improve the fuel economy of said vehicle.

10. The vehicle suspension system of claim 9, wherein the quantity of the total load carried by the vehicle minus the product of the maximum allowable axle load multiplied by the number of principal axles is determined to be greater than the minimum allowable axle load necessary multiplied by the number of lift axles, said vehicle suspension system further comprising signaling to move at least one lift axle so a principal axle carries the maximum allowable axle load.

11. The vehicle suspension system of claim 9, wherein the quantity of the total load carried by the vehicle minus the product of the maximum allowable axle load multiplied by the number of principal axles is determined to be less than or equal to the minimum allowable axle load necessary multiplied by the number of lift axles while at the same time the total load carried by the vehicle is greater than or equal to the total number of axles multiplied by the minimum allowable axle load necessary, said vehicle suspension system further comprising signaling to move at least one lift axle so a lift axle carries the minimum allowable axle load, or wherein the quantity of the total load carried by the vehicle minus the product of the maximum allowable axle load multiplied by the number of lift axles is determined to be less than or equal to the minimum allowable axle load necessary multiplied by the number of principal axles while at the same time the total load carried by the vehicle is greater than or equal to the total number of axles multiplied by the minimum allowable axle load necessary, said vehicle suspension system further comprising signaling to move at least one lift axle so a principal axle carries the minimum allowable axle load.

12. The vehicle suspension system of claim 9, wherein the quantity of the total load carried by the vehicle is determined to be less than the total number of axles multiplied by the minimum allowable axle load necessary, said vehicle suspension system further comprising signaling to move at least one lift axle so a lift axle carries no load or so that a principal axle carries no load.

13. The vehicle suspension system of any one of claim 9, in which the total number of axles on the vehicle is two, wherein said at least one principal axle is a drive axle and said at least one lift axle is a tag axle, and wherein said at least one processing device of said vehicle suspension system is configured for:
   determining whether the total load carried by the vehicle minus the maximum allowable axle load is greater than the minimum allowable axle load; or
   determining whether the total load carried by the vehicle minus the maximum allowable axle load is less than or equal to the minimum allowable axle load while also being greater than zero; or
   determining whether the total load carried by the vehicle minus the maximum allowable axle load is less than or equal to zero.

14. The vehicle suspension system of claim 13, wherein the quantity of the total load carried by the vehicle minus the maximum allowable axle load is determined to be greater than the minimum allowable axle load, said vehicle suspension system further comprising signaling to move the tag axle so the drive axle carries the maximum allowable axle load.

15. The vehicle suspension system of claim 13, wherein the quantity of the total load carried by the vehicle minus the maximum allowable axle load is determined to be less than or equal to the minimum allowable axle load while at the same time the total load carried by the vehicle is greater than the maximum allowable axle load necessary, said vehicle suspension system further comprising signaling to move the tag axle so that the tag axle carries the minimum allowable axle load.

16. The vehicle suspension system of claim 13, wherein the quantity of the total load carried by the vehicle minus the maximum allowable axle load is determined to be less than or equal to zero, said vehicle suspension system further comprising signaling to move the tag axle so the tag axle carries no load.

17. A vehicle having an improved vehicle fuel economy, comprising:
   an at least one lift axle;
   an at least one principal axle;
   tires mounted on the lift and principal axles;
   a memory for storing instructions, data or programs having algorithms;
   load sensors for determining a load on each of the principal and lift axles;
   a lift mechanism for lowering or raising the lift axle;
   at least one processing device in communication with said memory, said load sensors, and said lift mechanism, said processing device configured for:
   receiving measurements indicative of the load placed on the principal and lift axles as well as a total load carried by the vehicle;
   executing an algorithm depending on whether the tires on the lift axle have rolling resistance characteristics that are higher, lower or equivalent to the tires on the principal axle and subsequently sending a signal to the lift mechanism in order to move the lift axle to change the loads placed on the principal and lift axles;
   stopping the movement of the lift mechanism once a desired loads on the principal and lift axles have been reached; and,
   monitoring the total vehicle load over time.

18. The vehicle of claim 17, further comprising an output device for alerting an operator that the lift mechanism should be activated to adjust the load on the principal and lift axles so that the operator can signal the processing device to activate the lift mechanism.

19. The vehicle of claim 17, further comprising an input device for entering instructions or information and a Radio Frequency Identification ("RFID") chip attached to the tire, said RFID configured for storing and sending information concerning the rolling resistance characteristics of the tire to the processing device via the input device.

20. The vehicle of claim 17, further comprising a Society of Automotive Engineers ("SAE") J1939 compliant bus that interfaces with an electronic control system that acts as the processing device for controlling the lift mechanism.

21. The vehicle of claim 20, further comprising a SAE J1708 compliant bus that is connected with said electronic control system, said SAE J1708 compliant bus also communicating with switches for positioning the lift axle.

* * * * *